United States Patent
Shah et al.

(10) Patent No.: US 12,490,061 B2
(45) Date of Patent: Dec. 2, 2025

(54) METHODS AND SYSTEMS FOR UPDATING GROUP INFORMATION

(71) Applicant: Samsung Electronics Co., Ltd., Gyeonggi-do (KR)

(72) Inventors: Sapan Pramodkumar Shah, Bangalore (IN); Basavaraj Jayawant Pattan, Bangalore (IN); Narendranath Durga Tangudu, Bangalore (IN); Nishant Gupta, Bangalore (IN)

(73) Assignee: Samsung Electronics Co., Ltd., Seoul (KR)

( * ) Notice: Subject to any disclaimer, the term of this patent is extended or adjusted under 35 U.S.C. 154(b) by 292 days.

(21) Appl. No.: 18/016,089

(22) PCT Filed: Jul. 14, 2021

(86) PCT No.: PCT/KR2021/009048
§ 371 (c)(1),
(2) Date: Jan. 13, 2023

(87) PCT Pub. No.: WO2022/015050
PCT Pub. Date: Jan. 20, 2022

(65) Prior Publication Data
US 2023/0276202 A1    Aug. 31, 2023

(30) Foreign Application Priority Data
Jul. 14, 2020 (IN) .............................. 202041029962
Jul. 9, 2021 (IN) .............................. 202041029962

(51) Int. Cl.
*H04W 4/08*    (2009.01)
*H04W 4/40*    (2018.01)
*H04W 8/22*    (2009.01)

(52) U.S. Cl.
CPC ............... *H04W 4/08* (2013.01); *H04W 4/40* (2018.02); *H04W 8/22* (2013.01)

(58) Field of Classification Search
CPC ............ H04W 4/08; H04W 4/40; H04W 8/22
See application file for complete search history.

(56) References Cited

U.S. PATENT DOCUMENTS 8,819,120 B1    8/2014    Wang et al.
2010/0256852 A1    10/2010    Mudalige
(Continued)

FOREIGN PATENT DOCUMENTS

CN    106027233    10/2016
CN    108476394    8/2018
(Continued)

OTHER PUBLICATIONS

European Search Report dated Apr. 25, 2024 issued in counterpart application No. 21842143.6-1206, 9 pages.
(Continued)

*Primary Examiner* — Brian P Cox
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for on-network updating group information associated with a group.

17 Claims, 13 Drawing Sheets

(56) References Cited

U.S. PATENT DOCUMENTS

| | | | |
|---|---|---|---|
| 2013/0179056 A1 | 7/2013 | Fukuyama | |
| 2018/0188746 A1* | 7/2018 | Lesher | G05D 1/0217 |
| 2018/0199251 A1 | 7/2018 | Kim et al. | |
| 2019/0028866 A1 | 1/2019 | Baek et al. | |
| 2019/0313359 A1 | 10/2019 | Lee et al. | |
| 2019/0349719 A1 | 11/2019 | Pattan et al. | |
| 2020/0021451 A1* | 1/2020 | Pinheiro | H04W 4/06 |
| 2020/0092691 A1 | 3/2020 | Essaili et al. | |
| 2020/0118445 A1 | 4/2020 | Kim | |
| 2020/0162857 A1 | 5/2020 | Sugimoto | |
| 2020/0342766 A1* | 10/2020 | Gundavelli | G08G 1/22 |
| 2021/0321227 A1 | 10/2021 | Ge et al. | |

FOREIGN PATENT DOCUMENTS

| | | |
|---|---|---|
| CN | 110140414 | 8/2019 |
| CN | 110876133 | 3/2020 |
| CN | 111385746 | 7/2020 |
| EP | 3 216 305 | 11/2015 |
| JP | 2015-510699 | 4/2015 |
| WO | WO 2016 072814 | 5/2016 |
| WO | WO 2018/0355145 | 2/2018 |

OTHER PUBLICATIONS

Huawei et al., "Proposal for Solution to Key Issue on V2X Dynamic Groups", S6-181166, 3GPP TSG-SA WG6 Meeting #25, Jul. 23-27, 2018, 4 pages.

European Search Report dated Aug. 21, 2023 issued in counterpart application No. 21842143.6-1213, 15 pages.

PCT/ISA/210 Search Report issued on PCT/KR2021/009048, Nov. 16, 2021, pp. 4.

PCT/ISA/237 Written Opinion issued on PCT/KR2021/009048, Nov. 16, 2021, pp. 5.

Samsung, "Pseudo-CR on solution to key issues for V2X group management and group communication", 3GPP TSG-SA WG6 Meeting #38-e S6-201165 e-meeting, Jul. 15, 2020, pp. 7.

Chinese Office Action dated Apr. 8, 2025 issued in counterpart application No. 202180061288.1, 16 pages.

Chinese Office Action dated Sep. 26, 2025 issued in counterpart application No. 202180061288.1, 7 pages.

European Search Report dated Aug. 12, 2025 issued in counterpart application No. 21842143.6-1218, 10 pages.

* cited by examiner

[Fig. 10]
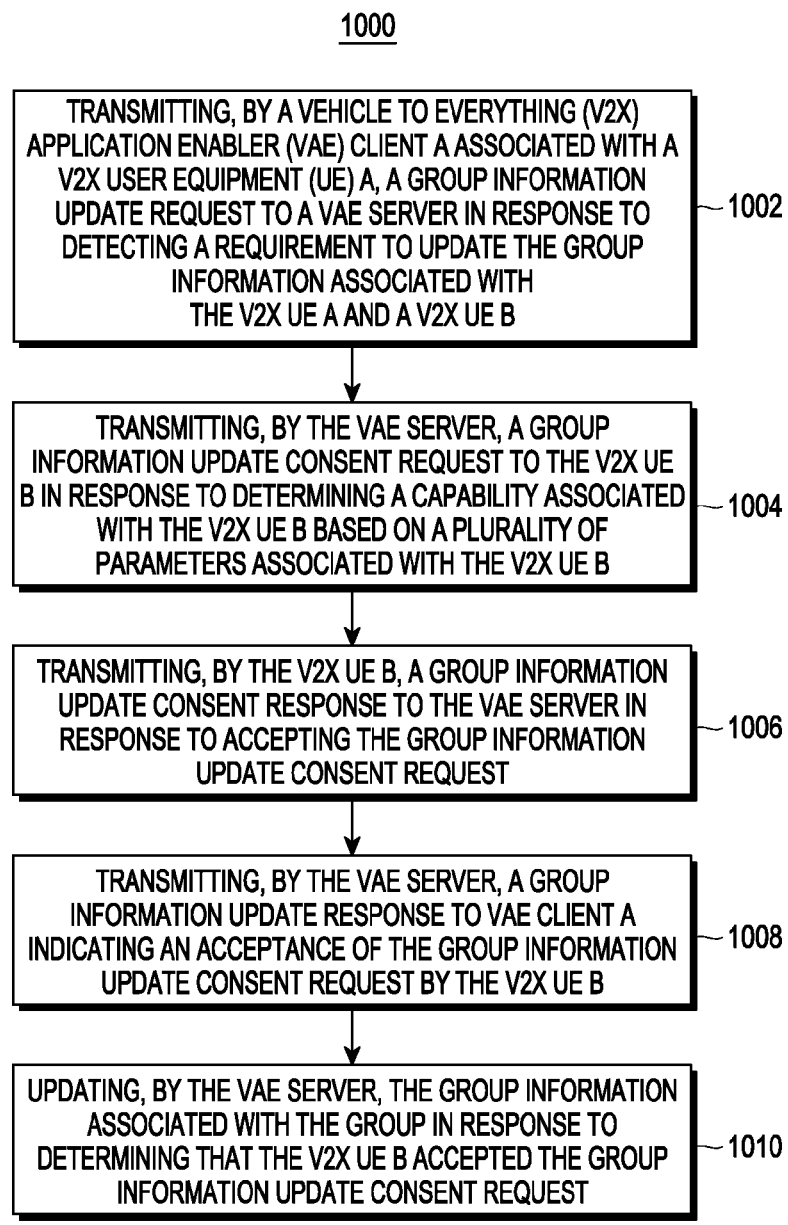

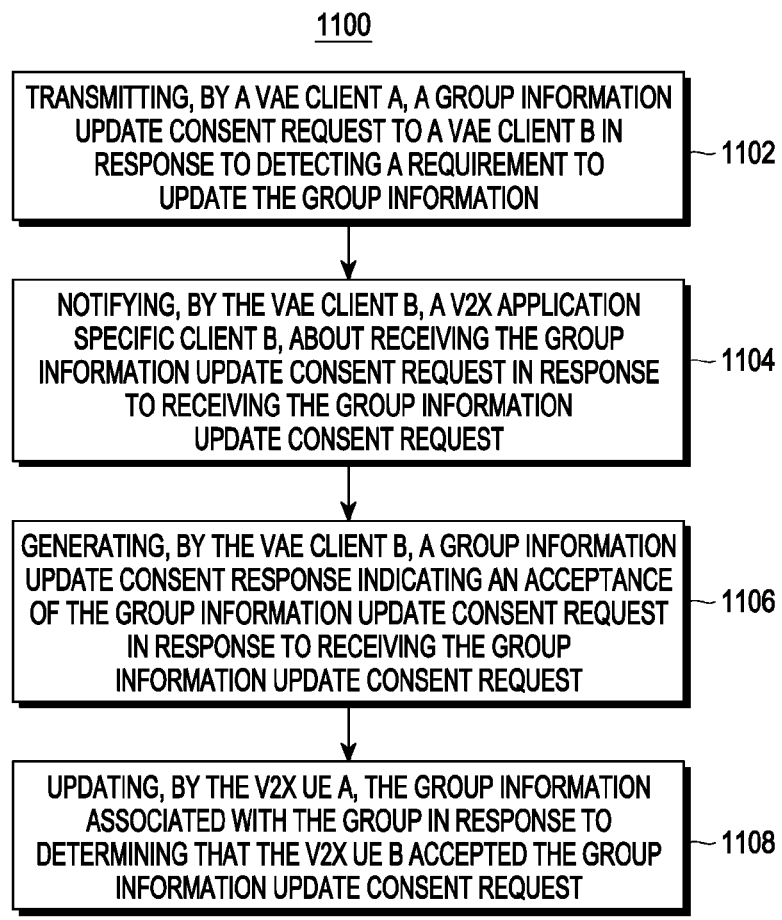

[Fig. 12]
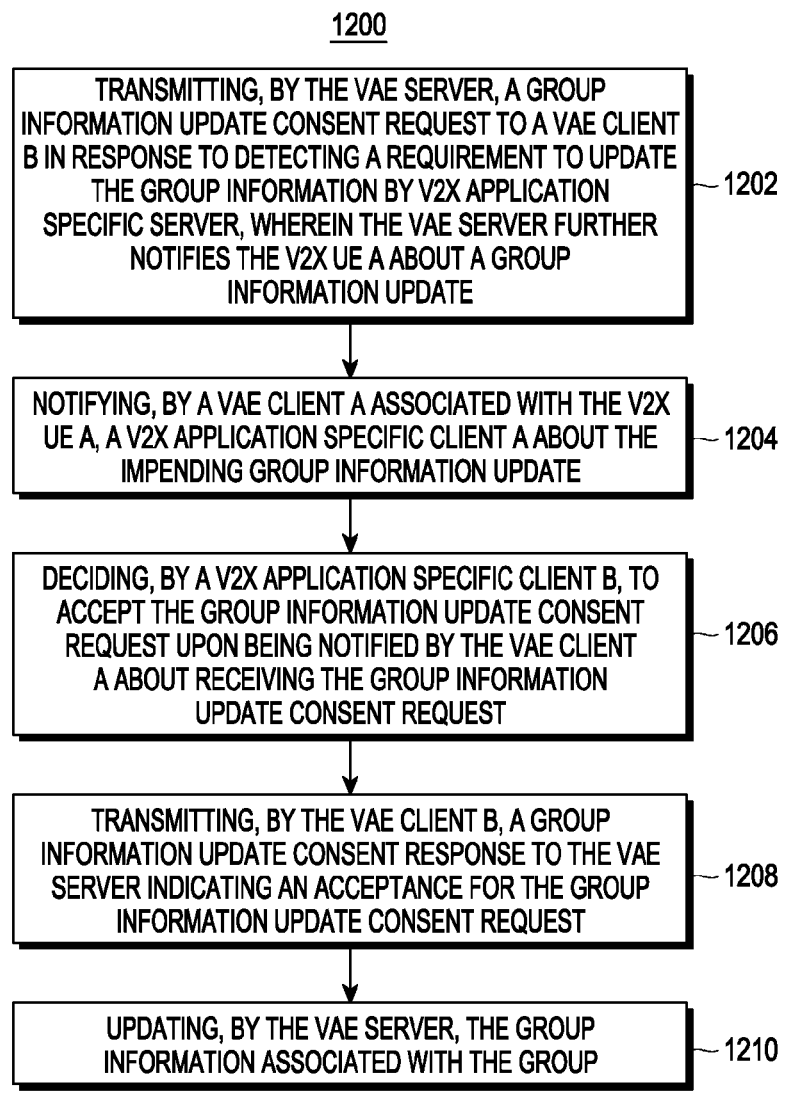

[Fig. 13]
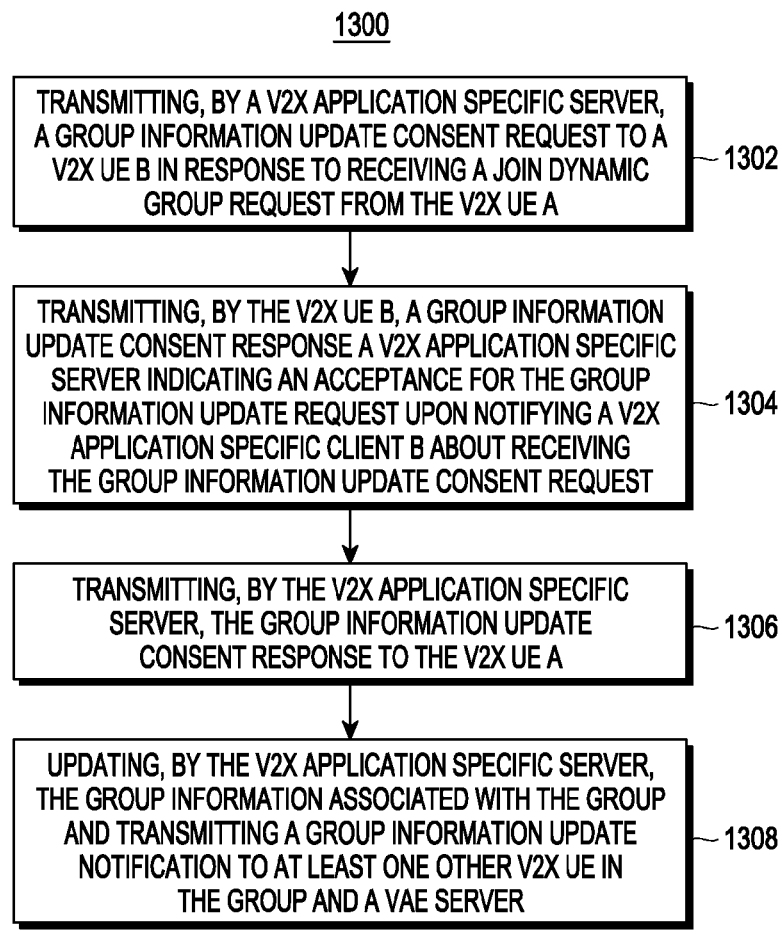
[Fig. 14]
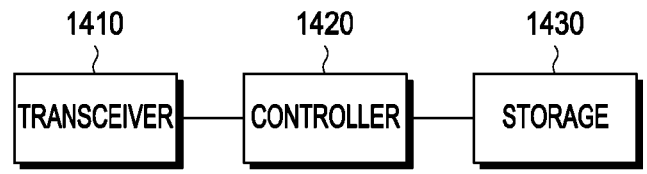
[Fig. 15]
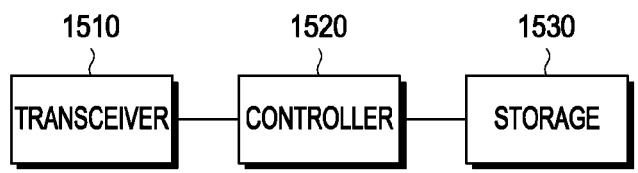

METHODS AND SYSTEMS FOR UPDATING GROUP INFORMATION

CROSS-REFERENCE TO RELATED APPLICATION(S)

This application is a National Phase Entry of PCT International Application No. PCT/KR2021/009048, which was filed on Jul. 14, 2021, and claims priority to Indian Provisional Patent Application No. 202041029962 filed on Jul. 14, 2020, and Indian Complete Patent application No. 202041029962 filed on Jul. 9, 2021, in the Indian Intellectual Property Office, the entire content of each of which is incorporated herein by reference.

TECHNICAL FIELD

The present disclosure, in general, relates to updating group information related to a group, and, in particular, relates to changing a group leader of the group.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In V2X communication, different entities (like vehicle, Roadside Unit (RSU), application server and pedestrians) exchange their own status information, such as position, speed and heading, with other nearby vehicles, infrastructure nodes and/or pedestrians. V2X applications can use "cooperative awareness" to provide more intelligent services for end-users.

Among multiple use cases, one of the categories of use cases is related to vehicle platooning. In V2X, Platooning is operating a group of vehicles in a closely linked manner so that the vehicles move like a train with virtual strings attached between vehicles. All the vehicles in the platoon receive periodic data from the leading vehicle, to carry on platoon operations. The platoon creator is responsible for platoon management. Platoon leader plays important role in managing platoon. The platoon leader should real-time update surrounding traffic data reported by group members and report it to RSU. At the same time, the platoon leader should real-time receive RSU messages, which include road conditions and traffic information far away from them, and share them with platoon members. The platoon leader also coordinates mobility of group of vehicles, sharing maneuver and other information with each other.

The platoon leader needs to constantly remain active and continue communicating with other vehicles, the leader consumes more resources than other vehicles, and so sometimes the lead vehicle may request next vehicle to be a leader. This kind of communication can be done between the two vehicles without other vehicles' involvement.

Currently, there is no technique available on-network or off-network for the group leader to delegate another vehicle as platoon leader and notify the change of leader vehicle to other member vehicles of the platoon. Also, in certain situations, the lead vehicle may not be in a position to request another vehicle in the platoon to be the leader. In such scenarios, the VAE server decides to change the lead vehicle. Currently, there is no method available for VAE server to on-network change the group leader.

To support cooperative driving, the vehicles in platoon share a message with the group information (i.e. size, speed, gap policies, their positions in the group, planned trajectory, etc.) to other vehicles, which are not a member of the platoon. It is possible for other vehicle to receive the message and identify the acceptable group based on certain criteria (i.e. speed and gap policies, size). The vehicle can send request to join the specific group and the group leader may accept or reject the request to join the group.

Currently, there is no method available for non-member vehicles to request to join specific group based on certain criteria and for the group-leader to take a decision on the request to join the group by the non-member vehicle.

Thus, there is a need for a solution that overcomes the above deficiencies.

Solution to Problem

This summary is provided to introduce a selection of concepts, in a simplified format, that are further described in the detailed description of the invention. This summary is neither intended to identify key or essential inventive concepts of the invention and nor is it intended for determining the scope of the invention.

Aspects of the disclosure are to address at least the above-mentioned problems and/or disadvantages and to provide at least the advantages described below.

Accordingly, an aspect of the disclosure there is to provide A method for updating group information associated with a group in an on-network communication, the method comprising: receiving, by a Vehicle to Everything (V2X) Application Enabler (VAE) server, a group information update request from a first VAE client associated with a first V2X User Equipment (UE), the group information update request being based on detecting a requirement to update the group information associated with the first V2X UE and a second V2X UE; transmitting, by the VAE server, a group information update consent request to the second V2X UE based on determining a capability associated with the second V2X UE using at least one parameter associated with the second V2X UE; receiving, by the VAE server, a group information update consent response from the second V2X UE, the group information update consent response being based on accepting the group information update consent request; transmitting, by the VAE server, a group information update response to the first VAE client indicating an acceptance of the group information update consent request by the second V2X UE; and updating, by the VAE server, the group information associated with the group based on identifying that the second V2X UE accepts the group information update consent request.

Another aspect of the disclosure is to provide a method for updating group information associated with a group in an off-network communication, the method comprising: transmitting, by a first VAE client associated with a first V2X UE, a group information update consent request to a second VAE client associated with a first V2X UE, the group information update consent request being based on detecting a requirement to update the group information; receiving, by the first VAE client, a group information update consent response indicating an acceptance of the group information update consent request from the second VAE client; and updating, by the first V2X UE, the group information associated with the group based on identifying that the second V2X UE accepts the group information update consent request.

Another aspect of the disclosure is to provide a method for updating group information associated with a group by a VAE server in an on-network communication, the method comprising: transmitting, by the VAE server, a group information update consent request to a second VAE client associated with a second V2X UE, the group information update consent request being based on detecting a requirement to update the group information by V2X application specific server, transmitting, by the VAE server, an indication about a group information update to a first VAE client associated with a first V2X UE; receiving, by the VAE server, a group information update consent response indicating an acceptance for the group information update consent request from the second VAE client; and updating, by the VAE server, the group information associated with the group.

Another aspect of the disclosure is to provide a VAE server for updating group information associated with a group in an on-network communication, the VAE server comprising: a transceiver; and a controller coupled with the transceiver and configured to control to: receive a group information update request from a first VAE client associated with a first V2X User Equipment (UE), the group information update request being based on detecting a requirement to update the group information associated with the first V2X UE and a second V2X UE; transmit a group information update consent request to the second V2X UE based on determining a capability associated with the second V2X UE using at least one parameter associated with the second V2X UE; receive a group information update consent response from the second V2X UE, the group information update consent response being based on accepting the group information update consent request; transmit a group information update response to the first VAE client indicating an acceptance of the group information update consent request by the second V2X UE; and update the group information associated with the group based on identifying that the second V2X UE accepts the group information update consent request.

Another aspect of the disclosure is to provide a first V2X UE for updating group information associated with a group in an on-network communication, the first V2X UE comprising: a transceiver; and a controller coupled with the transceiver and configured to control to: transmit a group information update consent request to a second VAE client associated with a first V2X UE, the group information update consent request being based on detecting a requirement to update the group information; receive a group information update consent response indicating an acceptance of the group information update consent request from the second VAE client; and update the group information associated with the group based on identifying that the second V2X UE accepts the group information update consent request.

Another aspect of the disclosure is to provide a VAE server for updating group information associated with a group in an on-network communication, the VAE server comprising: a transceiver; and a controller coupled with the transceiver and configured to control to: transmit a group information update consent request to a second VAE client associated with a second V2X UE, the group information update consent request being based on detecting a requirement to update the group information by V2X application specific server, transmit an indication about a group information update to a first VAE client associated with a first V2X UE; receive a group information update consent response indicating an acceptance for the group information update consent request from the second VAE client; and update the group information associated with the group.

Another aspect of the disclosure is to a method for on-network updating group information associated with a group. The method includes transmitting, by a Vehicle to Everything (V2X) Application Enabler (VAE) client A associated with a V2X User Equipment (UE) A, a group information update request to a VAE server in response to detecting a requirement to update the group information associated with the V2X UE A and a V2X UE B. The method includes transmitting, by the V2X UE B, a group information update consent response to the VAE server in response to accepting the group information update consent request. The method includes transmitting, by the VAE server, a group information update response to VAE client A indicating an acceptance of the group information update consent request by the V2X UE B. The method further includes updating, by the VAE server, the group information associated with the group in response to determining that the V2X UE B accepted the group information update consent request.

Another aspect of the disclosure is to a method for off-network updating group information associated with a group. The method includes transmitting, by a VAE client A, a group information update consent request to a VAE client B in response to detecting a requirement to update the group information. The method includes, notifying, by the VAE client B, a V2X application specific client B, about receiving the group information update consent request in response to receiving the group information update consent request. The method includes generating, by the VAE client B, a group information update consent response indicating an acceptance of the group information update consent request in response to receiving the group information update consent request. The method further includes updating, by the V2X UE A, the group information associated with the group in response to determining that the V2X UE B accepted the group information update consent request.

Another aspect of the disclosure is to a method for on-network updating group information associated with a group by a VAE server. The method includes, transmitting, by the VAE server, a group information update consent request to a VAE client B in response to detecting a requirement to update the group information by V2X application specific server, wherein the VAE server further notifies the V2X UE A about a group information update. The method includes notifying, by a VAE client A associated with the V2X UE A, a V2X application specific client A about the impending group information update. The method includes deciding, by a V2X application specific client B, to accept the group information update consent request upon being notified by the VAE client A about receiving the group information update consent request. The method includes transmitting, by the VAE client B, a group information update consent response to the VAE server indicating an acceptance for the group information update consent request. The method further includes updating, by the VAE server, the group information associated with the group.

Another aspect of the disclosure is to a method for updating group information by a V2X UE A. The method includes transmitting, by a V2X application specific server, a group information update consent request to a V2X UE B in response to receiving a join dynamic group request from the V2X UE A. The method includes transmitting, by the V2X UE B, a group information update consent response to a V2X application specific server indicating an acceptance for the group information update request upon notifying a V2X application specific client B about receiving the group information update consent request. The method includes transmitting, by the V2X application specific server, the group information update consent response to the V2X UE A. The method further includes updating, by the V2X application specific server, the group information associated with the group and transmitting a group information update notification to at least one other V2X UE in the group and a VAE server.

Another aspect of the disclosure is to a system for updating group information associated with a group in an on-network communication. The system includes a Vehicle to Everything (V2X) Application Enabler (VAE) client A associated with a V2X User Equipment (UE) A configured to transmit a group information update request to a VAE server in response to detecting a requirement to update the group information associated with the V2X UE A and a V2X UE B. The system includes the VAE server configured to transmit a group information update consent request to the V2X UE B in response to determining a capability associated with the V2X UE B based on a plurality of parameters associated with the V2X UE B. The system includes the V2X UE B configured to transmit a group information update consent response to the VAE server in response to accepting the group information update consent request. The system includes the VAE server configured to transmit a group information update response to VAE client A indicating an acceptance of the group information update consent request by the V2X UE B. The system includes the VAE server configured to update the group information associated with the group in response to determining that the V2X UE B accepted the group information update consent request.

Another aspect of the disclosure is to a system for updating group information associated with a group in an off-network communication. The system includes a VAE client A configured to transmit a group information update consent request to a VAE client B in response to detecting a requirement to update the group information. The system includes the VAE client B configured to notify a V2X application specific client B, about receiving the group information update consent request in response to receiving the group information update consent request. The VAE client B is further configured to generate a group information update consent response indicating an acceptance of the group information update consent request in response to receiving the group information update consent request. The system includes the V2X UE A configured to update the group information associated with the group in response to determining that the V2X UE B accepted the group information update consent request.

Another aspect of the disclosure is to a system for updating group information associated with a group by a VAE server in an on-network communication. The system includes the VAE server configured to transmit a group information update consent request to a VAE client B in response to detecting a requirement to update the group information by V2X application specific server, wherein the VAE server further notifies the V2X UE A about a group information update. The system includes a VAE client A associated with the V2X UE A configured to notify a V2X application specific client A about the impending group information update. The system includes a V2X application specific client B configured to decide to accept the group information update consent request upon being notified by the VAE client A about receiving the group information update consent request. The system includes the VAE client B configured to transmit a group information update consent response to the VAE server indicating an acceptance for the group information update consent request. The system includes the VAE server configured to update the group information associated with the group.

Another aspect of the disclosure is to a system for updating group information by a V2X UE A. The system includes a V2X application specific server configured to transmit a group information update consent request to a V2X UE B in response to receiving the join dynamic group request from a the V2X UE A. The system includes the V2X UE B configured to transmit a group information update consent response indicating an acceptance for the group information update request upon notifying the V2X application specific client B about receiving the group information update consent request. The system includes the V2X application specific server configured to transmit the group information update consent response to the V2X UE A. The system includes the V2X application specific server configured to update the group information associated with the group and transmitting a group information update notification to at least one other V2X UE in the group and a VAE server.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

Advantageous Effects of Invention

Additional aspects and advantages of the present invention will be partially appreciated and become apparent from the descriptions below, or will be well learned from the practices of the present invention.

According to the disclosure, the group information of the V2X platoon group can be efficiently updated.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 10 illustrates a schematic block diagram depicting a method for updating group information associated with a group in an on-network communication, according to an embodiment of the present subject matter;

FIG. 11 illustrates a schematic block diagram depicting a method for updating group information associated with a group in an off-network communication, according to an embodiment of the present subject matter;

FIG. 12 illustrates a schematic block diagram depicting a method for updating group information associated with a group by a VAE server in an on-network communication, according to an embodiment of the present subject matter; and FIG. 13 illustrates a schematic block diagram depicting a method for updating group information associated with a group by a V2X UE A, according to an embodiment of the present subject matter.

FIG. 14 is a block diagram of a V2X UE according to an embodiment of the disclosure.

FIG. 15 is a block diagram of a server according to an embodiment of the disclosure.

Figure 1:
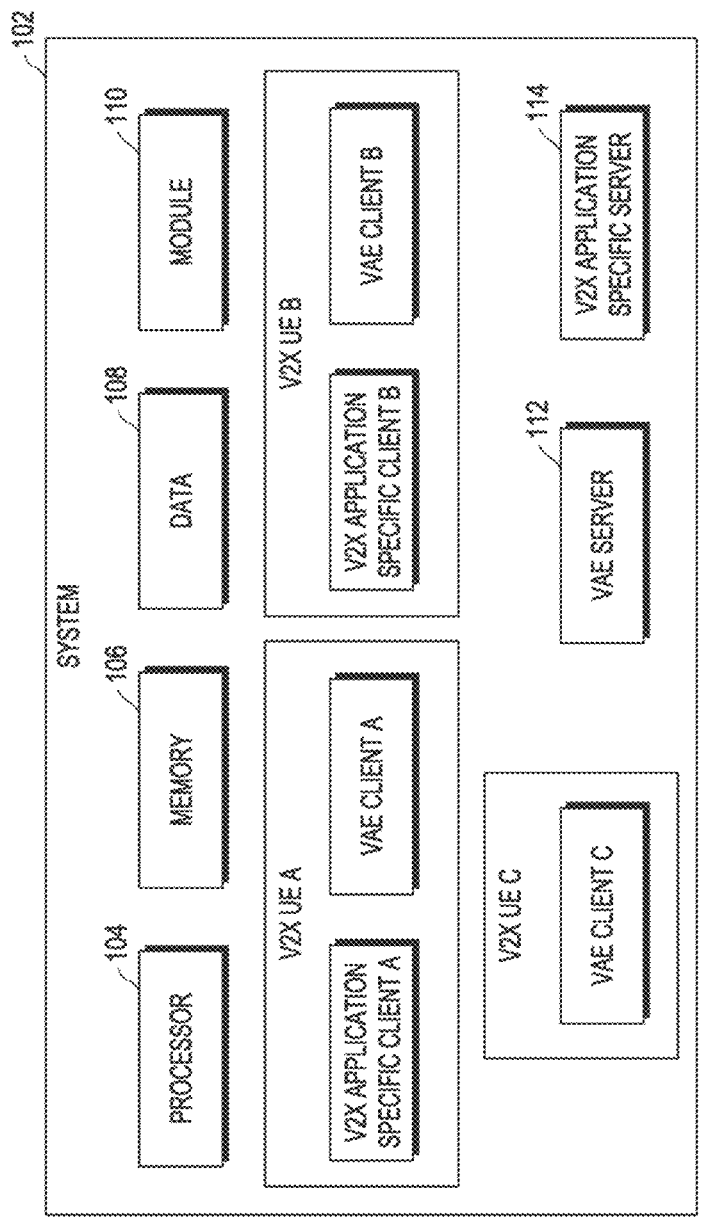
FIG. 1 illustrates a schematic block diagram depicting a system for updating group information associated with a group, in accordance with an embodiment of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

Mode for the Invention

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

FIG. 1 illustrates a schematic block diagram 100 depicting a system 102 for updating group information associated with a group, in accordance with an embodiment of the present subject matter. In an embodiment, the system 102 may be configured to update the group information through a Vehicle to Everything (V2X) Application Enabler (VAE) layer. In an embodiment, the group may be a platoon of vehicles and the group may interchangeably be referred as the platoon of vehicles. In an embodiment, the platoon of vehicles may include a plurality of vehicles (V2X User Equipment (UE) A, V2X UE B, and V2X UE C) with a vehicle (V2X UE A) acting as a group leader broadcasting the group information to other vehicles (V2X UE B, and V2X UE C) present in the platoon of vehicles. In an embodiment, updating the group information may correspond to updating at least one parameter associated with the group such that the group information consists of the at least parameter. In an embodiment, the at least one parameter may include information related to a group leader of the group. In an exemplary embodiment, the at least one parameter may include information related to a group membership update, and a group policy update or the like. In an embodiment, updating the group information may indicate changing the group leader and selecting another vehicle from the plurality of vehicles as a new group leader. In an embodiment, the group leader may be a vehicle referred as V2X UE A and the new group leader may be another vehicle referred as V2X UE B.

Continuing with the above embodiment, the system 102 may include a processor 104, a memory 106, data 108, module(s) 110, the V2X UE A, the V2X UE B, a V2X UE C, a VAE server 112, and a V2X application specific server 114. Further, the V2X UE A includes a V2X Application Specific Client A, and a VAE client A. Furthermore, the V2X UE B incudes a V2X Application Specific Client B and a VAE client B. In an embodiment, the V2X UE C includes a VAE client C. In an embodiment, the processor 104, the memory 106, the data 108, the module(s) 110, the V2X UE A, the V2X UE B, the V2X UE C, the VAE server 112, and the V2X application specific server 114 may be communicably coupled to one another.

As would be appreciated, the system 102, may be understood as one or more of a hardware, a software, a logic-based program, a configurable hardware, and the like. In an example, the processor 104 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 104 may be configured to fetch and/or execute computer-readable instructions and/or data 108 stored in the memory 106.

In an example, the memory 106 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 106 may include the data 108.

The data 108 serves, amongst other things, as a repository for storing data processed, received, and generated by one or more of, the processor 104, the memory 106, module(s) 110, the V2X UE A, the V2X UE B, the V2X UE C, the VAE server 112, and the V2X application specific server 114.

The module(s) 110, amongst other things, may include routines, programs, objects, components, data structures, etc., which perform particular tasks or implement data types. The module(s) 110 may also be implemented as, signal processor(s), state machine(s), logic circuitries, and/or any other device or component that manipulate signals based on operational instructions.

Further, the module(s) 110 may be implemented in hardware, instructions executed by at least one processing unit, for e.g., processor 104, or by a combination thereof. The processing unit may be a general-purpose processor which executes instructions to cause the general-purpose processor to perform operations or, the processing unit may be dedicated to performing the required functions. In another aspect of the present disclosure, the module(s) 110 may be machine-readable instructions (software) which, when executed by a processor/processing unit, may perform any of the described functionalities.

In some example embodiments, the module(s) 110 may be machine-readable instructions (software) which, when executed by a processor/processing unit, perform any of the described functionalities.

In an embodiment, the system 102 may be configured to update the group information in an on-network communication. In an embodiment, the on-network communication for updating the group information may be initiated by a VAE client. In an embodiment, the VAE client updating the group information may be the VAE client A.

Continuing with the above embodiment, the VAE client A may be configured to detect the requirement to update the group information associated with the V2X UE A. Moving forward, the VAE client A may be configured to determine the V2X UE B as the new leader upon detecting the requirement to update the group information and update the group information associated with the V2X UE B.

In continuation with the above embodiment, the V2X application specific client A may be configured to inform the VAE client A for changing the group leader. In an embodiment, the V2X application client A may further be configured to share a V2X UE B identification, a group leader change type for changing the group leader.

Subsequent to the above embodiment, the VAE client may be configured to transmit a group information update request to the VAE server 112 upon detecting the requirement for updating the group information. In an embodiment, the group information update request may include a group identification associated with the group, updated group information, and relevant information indicating whether the update group information one or more of temporary, time bound, and permanent. In an embodiment, the requirement to update the group information may be detected upon determining an inability related to the V2X UE A. In an embodiment, the inability may indicate that the V2X UE A is not capable to lead the group. In an embodiment, the inability may be based on one or more technical issues, and a high fuel consumption by the V2X UE A.

In an embodiment, the VAE server 112 may be configured to receive the group information update request. Furthermore, the VAE server 112 may be configured to transmit a group information update consent request to the V2X UE B in response to determining a capability associated with the V2X UE B. In an embodiment, the group information update consent request may include the group identification, a V2X UE A identification, and relevant information such as a group leader change type indicating whether updating the group information is one or more of a temporary update, a time-bound update, and a permanent update, and the at least one parameter associated with the group. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group. In an embodiment, the capability associated with the V2X UE B indicates that the V2X UE B is capable to lead the group.

Continuing with the above embodiment, the VAE client B may be configured to transmit a group information update consent response to the VAE server 112 upon receiving the group information update consent request. In an embodiment, transmitting the group information update consent response may correspond to accepting the group information update consent request. In an embodiment, the acceptance to the group information update consent request by the V2X UE B may indicate that the V2X UE B accepted to lead the group.

Moving forward, the VAE server 112 may be configured to transmit a group information update response to VAE client A indicating an acceptance of the group information update consent request by the V2X UE B. In an embodiment, the VAE server 112 may further be configured to update the group information associated with the group upon receiving the group information update consent response. In an embodiment, the VAE client B may be configured to transmit the group information update consent response to the VAE client A upon accepting the group information update consent request.

Furthermore, the VAE server 112 may be configured to trigger a group information update notification to at least one other V2X UE in the group and the V2X application specific server 114 upon updating the group information. In an embodiment, the VAE server 112 may be configured to detect another requirement to update the group information. Upon determining that the V2X UE B is not accepting the group information update consent response. Moving forward, the VAE server 112 may be configured to transmit a group information update response to the VAE client A. In an embodiment, the group information update response may include at least one suggestion for updating the group information. In an embodiment, the at least one suggestion for the updating group information may indicate the V2X UE C as a second new group leader. Continuing with the above embodiment, the V2X UE A may be configured to initiate a group information update procedure to update the group information. In an embodiment, the VAE client B may be configured to transmit the group information update consent response to the VAE client A upon rejecting the group information update consent request. Further, the VAE client A may be configured to transmit the group information update consent request to the group. In an embodiment, the group information update consent request may include a V2X UE B identification, and the group leader change type. Furthermore, the VAE client B may be configured to transmit the group information update consent to the group in response to the VAE client A transmitting the group information update consent request to the group.

Subsequent to the present subject matter, the system 102 may be configured to update the group information in an off-network communication. In an embodiment, the off-network communication for updating the group information may be initiated by the VAE client A.

Continuing with the above embodiment, the VAE client A may be configured to detect the requirement to update the group information in the off-network communication. In an embodiment, detecting the requirement may correspond to determining the inability related to the V2X UE A. Furthermore, the V2X UE A may be configured to determine the V2X UE B as the new group leader. In continuation with the above embodiment, the V2X application specific client A may be configured to inform the VAE client A for changing the group leader. In an embodiment, the V2X application client A may further be configured to share a V2X UE B identification, a group leader change type for changing the group leader.

Furthermore, the VAE client A may be configured to transmit the group information update consent request to a VAE client B. In an embodiment, the requirement to update the group information may be related to the ability of the V2X UE A and the ability related to the V2X U B. In an embodiment, the group information update consent request may be transmitted to the VAE client B in response to determining the ability associated with the V2X UE B.

Moving forward, the VAE client B may be configured to notify a V2X application specific client B about receiving the group information update consent request upon receiving the group information update consent request. Furthermore, the VAE client B may be configured to generate the group information update consent response indicating the acceptance of the group information update consent request upon receiving the group information update consent request.

In an embodiment, the VAE client B may be configured to transmit the group information update consent response to the VAE client A upon accepting the group information update consent request. In an embodiment, the VAE client B may be configured to transmit the group information update consent response to the VAE client A upon rejecting the group information update consent.

Moving ahead, the V2X UE A may be configured to update the group information associated with the group in response to determining that the V2X UE B accepted the group information update consent request. Moving forward, the VAE client A may be configured to trigger the group information update notification to the at least one other V2X UE in the group, in response to determining that the group information is updated.

Subsequent to an embodiment of the present subject matter, the system 102 may be configured to update the group information by the VAE server 112 in the on-network communication. In an embodiment, the V2X application specific server 114 may be configured to detect the requirement to update the group information. Furthermore, based on that, the VAE server 112 may be configured to transmit the group information update consent request to the VAE client B. Further, the VAE server 112 may be configured to notify the V2X UE A about a group information update.

Continuing with the above embodiment, the VAE client A may be configured to notify the V2X application specific client A about the impending group information update. In an embodiment, the V2X application specific client B may be configured to decide to accept the group information update consent request upon being notified by the VAE client B about receiving the group information update consent request.

Moving forward, the VAE client B may be configured to transmit the group information update consent response to the VAE server 112 indicating the acceptance for the group information update consent request. Furthermore, the VAE server 112 may be configured to update the group information associated with the group. In an embodiment, the VAE server 112 may be configured to trigger the group information update notification to the at least one other V2X UE in the group and the V2X application specific server 114 indicating that the group information is updated.

Subsequent to an embodiment of the present subject matter, the system 102 may be configured to update the group information by the V2X UE A. In an embodiment, updating the group information may correspond to the V2X UE A joining the group led by the V2X UE B. In an embodiment, the VAE client A may be configured to decide to join the group in response to receiving a group message containing the group information. Furthermore, the V2X UE A may be configured to transmit a join dynamic group request to the V2X application specific server. In an embodiment, the join dynamic group request may include criteria associated with the group.

Furthermore, the V2X application specific server 114 may be configured to determine the group based on authorizing a user associated with the group. In an embodiment, the group may be determined for joining by the V2X UE A.

In an embodiment, the V2X application specific server 114 may be configured to transmit the group information update consent request to the V2X UE B in response to receiving the join dynamic group request from the V2X UE A. In an embodiment, the group information update consent request by the V2X UE A may correspond to requesting to join the group. Moving forward, the V2X UE B may be configured to transmit the group information update consent response to the V2X application specific server 114 indicating the acceptance for the group information update request upon notifying the V2X application specific client B about receiving the group information update consent request.

Continuing with the above embodiment, the V2X application specific server 114 may be configured to transmit the group information update consent response to the V2X UE A. In an embodiment, the group information update consent response by the V2X UE B may indicate the acceptance corresponding to the V2X UE B accepting to the V2X UE A to join the group. Furthermore, the V2X application specific server 114 may be configured to update the group information associated with the group. Further, the V2X application specific server 114 may be configured to transmit the group information update notification to at least one other V2X UE in the group and the VAE server 112.

Figure 2:
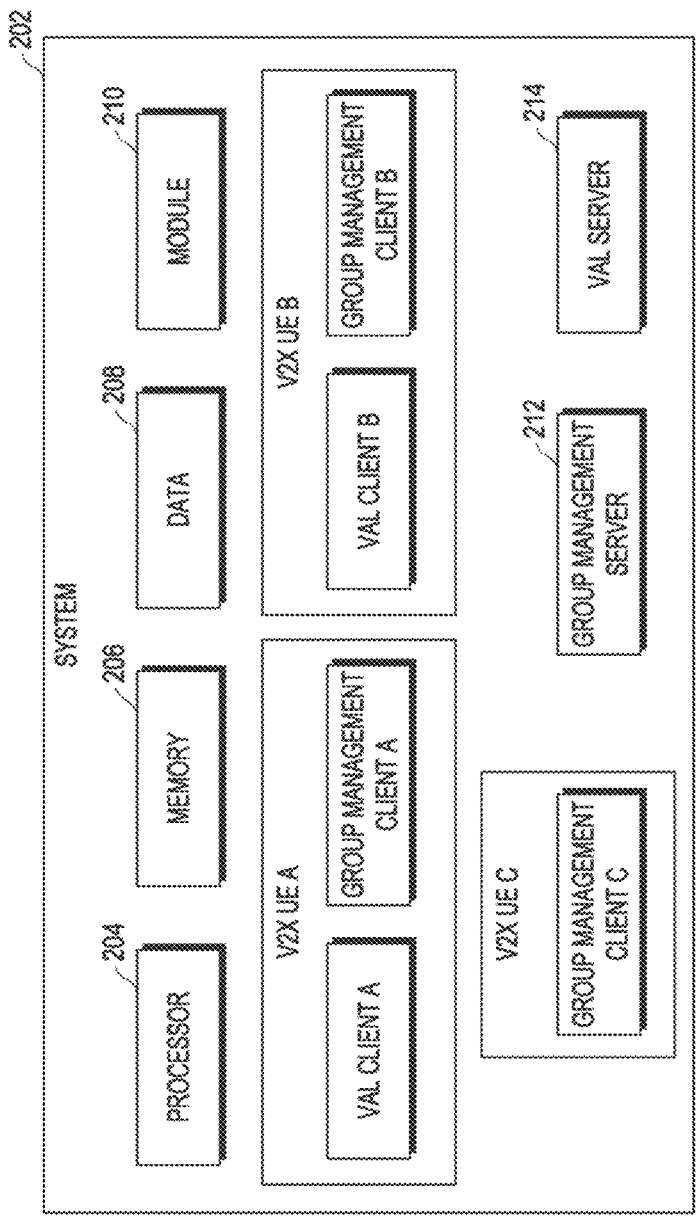
FIG. 2 illustrates a schematic block diagram depicting a system for updating group information associated with a group, in accordance with an embodiment of the present subject matter.

FIG. 2 illustrates a schematic block diagram 200 depicting a system 202 for updating group information associated with a group, in accordance with an embodiment of the present subject matter. In an embodiment, the system 202 may be configured to update the group information through a Service Enabler Architecture Layer (SEAL) client. In an embodiment, the group may be a platoon of vehicles and the group may interchangeably be referred as the platoon of vehicles. In an embodiment, the platoon of vehicles may include a plurality of vehicles (V2X UE A, V2X UE B, and V2X UE C) with a vehicle (V2X UE A) acting as a group leader broadcasting the group information to other vehicles (V2X UE B, and V2X UE C) present in the platoon of vehicles. In an embodiment, updating the group information may correspond to updating at least one parameter associated with the group such that the group information consists of the at least parameter. In an embodiment, the at least one parameter may include information related to a group leader of the group. In an exemplary embodiment, the at least one parameter may include information related to a group membership update, and a group policy update or the like. In an embodiment, updating the group information may indicate changing the group leader and selecting another vehicle from the plurality of vehicles as a new group leader. In an embodiment, the group leader may be a vehicle referred as V2X UE A and the new group leader may be another vehicle referred as V2X UE B.

Continuing with the above embodiment, the system 202 may include a processor 204, a memory 206, data 208, module(s) 210, the V2X UE A, the V2X UE B, a V2X UE C, a group management server 212, and a Vertical Application Layer (VAL) server 214. Further, the V2X UE A includes a VAL client A, and a group management client A. Furthermore, the V2X UE B incudes a VAL client B and a group management client B. In an embodiment, the V2X UE C includes a group management client C. In an embodiment, the processor 204, the memory 206, the data 208, the module(s) 210, the V2X UE A, the V2X UE B, the V2X UE C, the group management server 212, and the VAL server 214 may be communicably coupled to one another.

As would be appreciated, the system 202, may be understood as one or more of a hardware, a software, a logic-based program, a configurable hardware, and the like. In an example, the processor 204 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 204 may be configured to fetch and/or execute computer-readable instructions and/or data 208 stored in the memory 206.

In an example, the memory 206 may include any non-transitory computer-readable medium known in the art including, for example, volatile memory, such as static random-access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 206 may include the data 208.

The data 208 serves, amongst other things, as a repository for storing data processed, received, and generated by one or more of, the processor 204, the memory 206, the module(s), the V2X UE A, the V2X UE B, the V2X UE C, the Group management server 212, and the VAL server 214.

The module(s) 210, amongst other things, may include routines, programs, objects, components, data structures, etc., which perform particular tasks or implement data types. The module(s) 210 may also be implemented as, signal processor(s), state machine(s), logic circuitries, and/or any other device or component that manipulate signals based on operational instructions.

Further, the module(s) 210 may be implemented in hardware, instructions executed by at least one processing unit, for e.g., processor 204, or by a combination thereof. The processing unit may be a general-purpose processor which executes instructions to cause the general-purpose processor to perform operations or, the processing unit may be dedicated to performing the required functions. In another aspect of the present disclosure, the module(s) 210 may be machine-readable instructions (software) which, when executed by a processor/processing unit, may perform any of the described functionalities.

In some example embodiments, the module(s) 210 may be machine-readable instructions (software) which, when executed by a processor/processing unit, perform any of the described functionalities In an embodiment, the system 202 may be configured to update the group information in an on-network communication. In an embodiment, the on-network communication for updating the group information may be initiated by a SEAL client. In an embodiment, the VAE client updating the group information may be the group management client A.

Continuing with the above embodiment, the group management client A may be configured to detect the requirement update the group information associated with the V2X UE A. Further, the group management client A may be configured to transmit a group information update request to the group management server 212 upon detecting the requirement.

In an embodiment, the group information update request may include a group identification associated with the group, updated group information, and relevant information indicating whether the update group information one or more of temporary, time bound, and permanent. In an embodiment, the requirement to update the group information may be detected upon determining an inability related to the V2X UE A. In an embodiment, the inability may indicate that the V2X UE A is not capable to lead the group. In an embodiment, the inability may be based on one or more technical issues, and a high fuel consumption by the V2X UE A.

Subsequent to the above embodiment, the group management server 212 may be configured to receive the group information update request. Moving forward, the group management server 212 may be configured to authorize a V2X user to update the group information. To that understanding, the group management server 212 may be configured to transmit a group information update request acknowledgment message to the group management client A.

Continuing with the above embodiment, the group management server 212 may be configured to transmit a group information update consent request to the group management client B associated with the V2X UE B. In an embodiment, the group information update consent request may include the group identification, a V2X UE A identification, and relevant information such as a group leader change type indicating whether updating the group information is one or more of a temporary update, a time-bound update, and a permanent update, and the at least one parameter associated with the group. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group. In an embodiment, the capability associated with the V2X UE B indicates that the V2X UE B is capable to lead the group. Further, the group management client B may be configured to notify the VAL client B about receiving the group information update consent request.

In response to receiving the group information update consent request, the group management client B may further be configured to generate a group information update consent response. In an embodiment, the group information update consent response may indicate an acceptance corresponding to the group information update consent request. In an embodiment, the acceptance to the group information update consent request by the V2X UE B may indicate that the V2X UE B accepted to lead the group. Moving forward, the group management client B may further be configured to transmit the group management update consent response to the group management server 212.

In response to receiving the group information update consent response indicating that the group management client B accepted the group information, the group management server 212 may be configured to update the group information associated with the group.

Continuing with the above embodiment, the group management server 212 may be configured to transmit a group information update change response to the group management client A upon receiving the group information update consent response and updating the group information. In an embodiment, the group information update change response may indicate that the group information is updated.

Moving forward, the group management server 212 may be configured to transmit a group information update notification to the group management client C and the VAL server 214 in response to updating the group information. In an embodiment, the group information update notification may indicate that the group information is updated.

Subsequent to an embodiment of the present subject matter, the system 202 may be configured to update the group information by the SEAL client in an off-network communication. In an embodiment, the SEAL client may be the group management client A.

Continuing with the above embodiment, the group management client A may be configured to detect the requirement to update the group information. Moving forward, in response to detecting the requirement, the group management client A may be configured to transmit the group information update consent request to the group management client B. In an embodiment, the group identification update consent request may include a group identification, updated group information, and relevant information such as a group leader change type indicating whether updating the group information is one or more of a temporary update, a time-bound update, and a permanent update, and the at least one parameter associated with the group Subsequent to receiving the group information update consent request, the group management client B may be configured to notify the VAL client B about receiving the group information update consent request. Furthermore, the group management client B may be configured to accept the group information update consent request.

Upon accepting the group information update consent request, the group management client B may be configured to transmit the group information update consent response to the group management client A.

In continuation with the above embodiment, the group management client A may be configured to update the group information associated with the group in response to determining that the V2X UE B accepted the group information update consent request. Furthermore, the group management client B may be configured to transmit the group information change notification to at least one other group management client C in response to updating the group information.

In an embodiment of the present subject matter, the system 202 may be configured to update the group information by a SEAL server in an on-network communication. In an embodiment, the SEAL server may be the group management server 212. In an embodiment, the group management server 212 may be configured to detect the requirement to update the group information. Furthermore, the group management server 212 may be configured to transmit the group information update consent request to a group management client B associated with the V2X UE B. Also, the group management server 212 may be configured to notify the group management client A associated with the V2X UE A about a group information update. Subsequent to being notified, the group management client A may be configured to notify the VAL client A about the impending group information update. Further, the group management client A may be configured to notify the VAL client B about receiving the group information update consent request. Moving forward, the VAL client B may be configured to decide to accept the group information update consent request.

Further, the group management client B may be configured to transmit the group information update consent response to the group management server 212 indicating an acceptance for the group information update consent request. Furthermore, the group management server 212 may be configured to update the group information associated with the group. To that understanding, the group management server 212 may be configured to trigger the group information update notification to the at least one other V2X UE in the group and the VAL server 214 indicating that the group information is updated.

Figure 3:
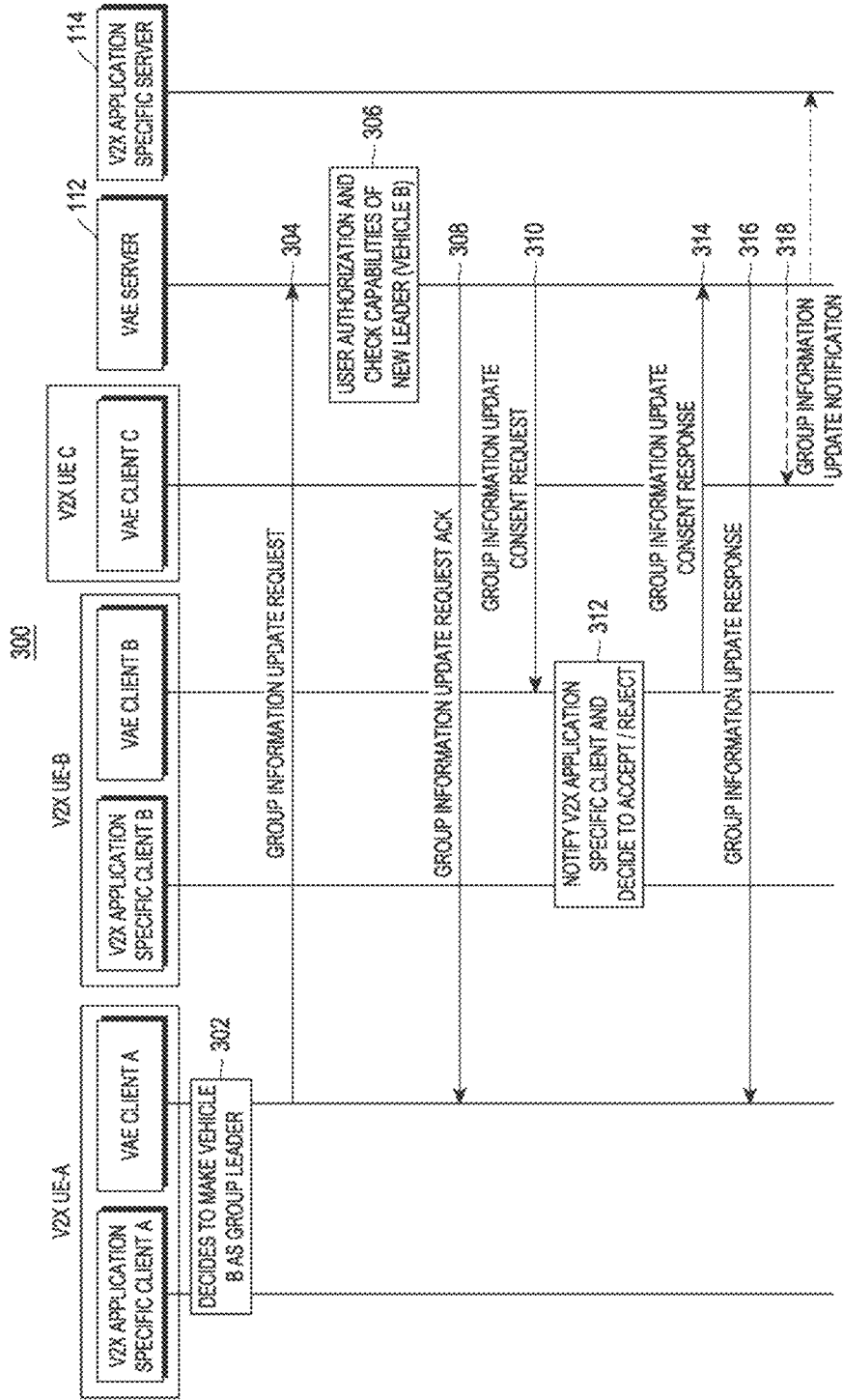
FIG. 3 illustrates an operational flow diagram depicting a process for updating group information associated with a group in an on-network communication by a VAE client, in accordance with an embodiment of the present subject matter.

FIG. 3 illustrates an operational flow diagram 300 depicting a process for updating group information associated with a group in an on-network communication by a VAE client, in accordance with an embodiment of the present subject matter. In an embodiment, the group may be a platoon of vehicles and the group may interchangeably be referred as the platoon of vehicles. In an embodiment, the platoon of vehicles may include a plurality of vehicles (V2X UE A, V2X UE B, and V2X UE C) with a vehicle (V2X UE A) acting as a group leader broadcasting the group information to other vehicles (V2X UE B, and V2X UE C) present in the platoon of vehicles.

In an embodiment, the process may include determining (step 302) the V2X UE B as the new group leader in response to detecting a requirement to update the group information. In an embodiment, the determining may be performed by the VAE client as referred in the FIG. 1. In an embodiment, detecting the requirement may correspond to determining an inability associated with the V2X UE A and a capability related to the V2X UE B. In an embodiment, the inability may correspond to an inability to lead the group and the capability may correspond to a capability to lead the group. In an embodiment, updating the group information may correspond to updating at least one parameter associated with the group such that the group information consists of the at least parameter. In an embodiment, the at least one parameter may include information related to a group leader of the group such that the V2X UE B is selected as the new group leader by removing the V2X UE A acting as the group leader. In continuation with the above embodiment, the process may include informing by the V2X application specific client A as referred in the FIG. 1, the VAE client A for changing the group leader. In an embodiment, the V2X application client A may further be configured to share a V2X UE B identification, a group leader change type for changing the group leader.

Continuing with the above embodiment, the process may proceed towards transmitting (step 304) a group information update request to the VAE server 112 as referred in the FIG. 1. In an embodiment, the group information update request may be transmitted by the VAE client A. In an embodiment, the group information update request may include a group identification associated with the group, updated group information, and relevant information indicating whether the update group information one or more of temporary, time bound, and permanent. In an embodiment, the requirement to update the group information may be detected upon determining the inability related to the V2X UE A.

In an embodiment, the process may include authorizing (step 306) by the VAE server 112 a user of the V2X UE B and determining the capability associated with the V2X UE B. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

Continuing with the above embodiment, the process may include transmitting (step 308) a group information update request acknowledgment message to the VAE client A in response to authorization of a V2X user to update the group information.

Continuing with the above embodiment, the process may include transmitting (step 310) a group information update consent request to the V2X UE B in response to determining the capability associated with the V2X UE B. In an embodiment, the group information update consent request may be transmitted by the VAE server 112. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

In an embodiment, the process may include notifying (step 312) by the VAE client B, the V2X application specific client B about receiving the group information update consent request. Moving ahead, the process may include accepting the group information update consent request. In an embodiment, the acceptance to the group information update consent request by the V2X UE B may indicate that the V2X UE B accepted to lead the group.

Continuing with the above embodiment, the process may proceed towards transmitting (step 314) by the VAE server 112 a group information update consent response to VAE client A indicating an acceptance of the group information update consent request by the V2X UE B. In an embodiment, the VAE server 112 may further be configured to update the group information associated with the group upon receiving the group information update consent response.

In an embodiment, where it is determined that the V2X UE B rejected the group information update consent request, the process includes detecting by the VAE server 112 another requirement to update the group information. In an embodiment, the other requirement may correspond to selecting the V2X UE C as the new group leader in response to rejection by the V2X UE B. Moving ahead, the process includes transmitting, by the VAE server 112, a group information update change response to the VAE client A. In an embodiment, the group information update change response may include at least one suggestion for updating the group information. In an embodiment, the at least one suggestion for the updating group information may indicate a V2X UE C as a second new group leader. Furthermore, the process includes initiating a group information update procedure to update the group information based on the other requirement.

In an embodiment, the process includes (step 316) transmitting by the VAE server 112 a group information update response to the VAE client A indicating that the group information is updated.

In an embodiment, the process may include triggering (step 318) by the VAE server 112 a group information update notification to at least one other V2X UE in the group and the V2X application specific server 114 upon updating the group information. In an embodiment, the group information update change notification may indicate that the group information is updated and the V2X UE B is the new group leader.

Figure 4:
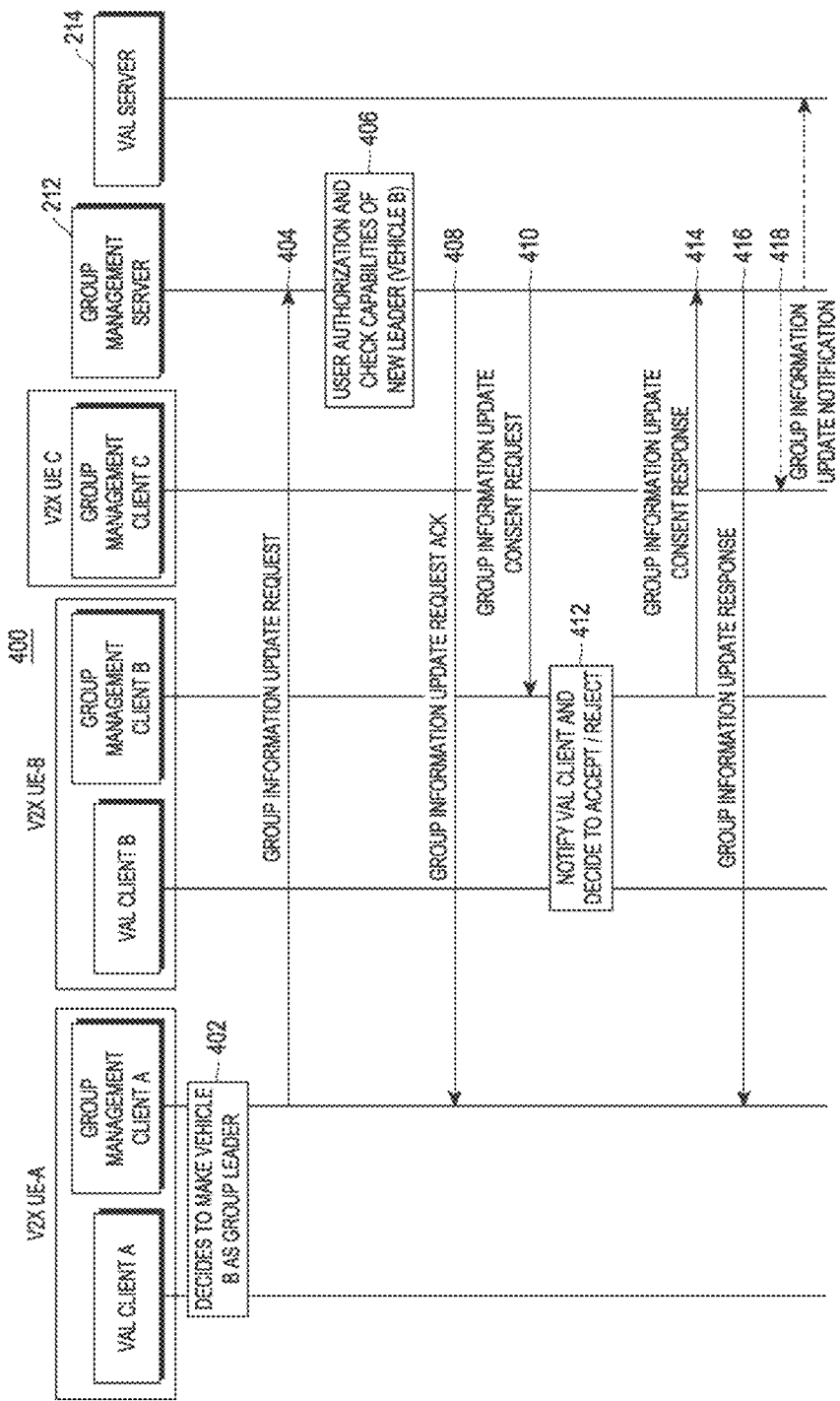
FIG. 4 illustrates an operational flow diagram depicting a process for updating group information associated with a group in an on-network communication by a SEAL client, in accordance with an embodiment of the present subject matter.

FIG. 4 illustrates an operational flow diagram 400 depicting a process for updating group information associated with a group in an on-network communication by a SEAL client, in accordance with an embodiment of the present subject matter. In an embodiment, the SEAL client may be a group management client. In an embodiment, the group may be a platoon of vehicles and the group may interchangeably be referred as the platoon of vehicles. In an embodiment, the platoon of vehicles may include a plurality of vehicles (V2X UE A, V2X UE B, and V2X UE C) with a vehicle (V2X UE A) acting as a group leader broadcasting the group information to other vehicles (V2X UE B, and V2X UE C) present in the platoon of vehicles.

In an embodiment, the process may include determining (step 402) the V2X UE B as the new group leader in response to detecting a requirement to update the group information. In an embodiment, the determining may be performed by the group management client A client as referred in the FIG. 1. In an embodiment, detecting the requirement may correspond to determining an inability associated with the V2X UE A and a capability related to the V2X UE B. In an embodiment, the inability may correspond to an inability to lead the group and the capability may correspond to a capability to lead the group. In an embodiment, updating the group information may correspond to updating at least one parameter associated with the group such that the group information consists of the at least parameter. In an embodiment, the at least one parameter may include information related to a group leader of the group such that the V2X UE B is selected as the new group leader by removing the V2X UE A acting as the group leader. In continuation with the above embodiment, the process may include informing by the VAL client A as referred in the FIG. 1, the group management client A for changing the group leader. In an embodiment, the VAL client A may further be configured to share a V2X UE B identification, a group leader change type for changing the group leader.

Continuing with the above embodiment, the process may proceed towards transmitting (step 404) a group information update request to the group management server 212 as referred in the FIG. 2. In an embodiment, the group information update request may be transmitted by the group management client A. In an embodiment, the group information update request may include a group identification associated with the group, updated group information, and relevant information indicating whether the update group information one or more of temporary, time bound, and permanent. In an embodiment, the requirement to update the group information may be detected upon determining the inability related to the V2X UE A.

In an embodiment, the process may include authorizing (step 406) by the group management server 212 a user of the V2X UE B and determining the capability associated with the V2X UE B. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

Continuing with the above embodiment, the process may include transmitting (step 408) a group information update request acknowledgment message to the group management client A in response to authorization of a V2X user to update the group information. In an embodiment, the group information update request acknowledgment message may be transmitted by the group management server 212.

Continuing with the above embodiment, the process may include transmitting (step 410) a group information update consent request to the V2X UE B in response to determining the capability associated with the V2X UE B. In an embodiment, the group information update consent request may be transmitted by the group management server 212. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

In an embodiment, the process may include notifying (step 412) by the group management client B, the VAL client B about receiving the group information update consent request. Moving ahead, the process may include accepting the group information update consent request by the V2X UE B. In an embodiment, the acceptance to the group information update consent request by the V2X UE B may indicate that the V2X UE B accepted to lead the group.

Continuing with the above embodiment, the process may proceed towards transmitting (step 414) by the group management client B, a group information update consent response to group management server 212 indicating an acceptance of the group information update consent request by the V2X UE B. In an embodiment, the group management server 212 may further be configured to update the group information associated with the group upon receiving the group information update consent response.

In an embodiment, where it is determined that the V2X UE B rejected the group information update consent request, the process includes detecting by the group management server 212 another requirement to update the group information. In an embodiment, the other requirement may correspond to selecting the V2X UE C as the new group leader in response to rejection by the V2X UE B. Moving ahead, the process includes transmitting, by the group management server 212, a group information update change response to the group management client A. In an embodiment, the group information update change response may include at least one suggestion for updating the group information. In an embodiment, the at least one suggestion for the updating group information may indicate a V2X UE C as a second new group leader. Furthermore, the process includes initiating a group information update procedure to update the group information based on the other requirement.

In an embodiment, the process includes (step 416) transmitting by the group management server 212 a group information update response to the group management client A indicating that the group information is updated.

In an embodiment, the process may include triggering (step 418) by the group management server 212 a group information update notification to at least one other V2X UE in the group and the VAL server 214 upon updating the group information. In an embodiment, the group information update change notification may indicate that the group information is updated and the V2X UE B is the new group leader.

Figure 5:
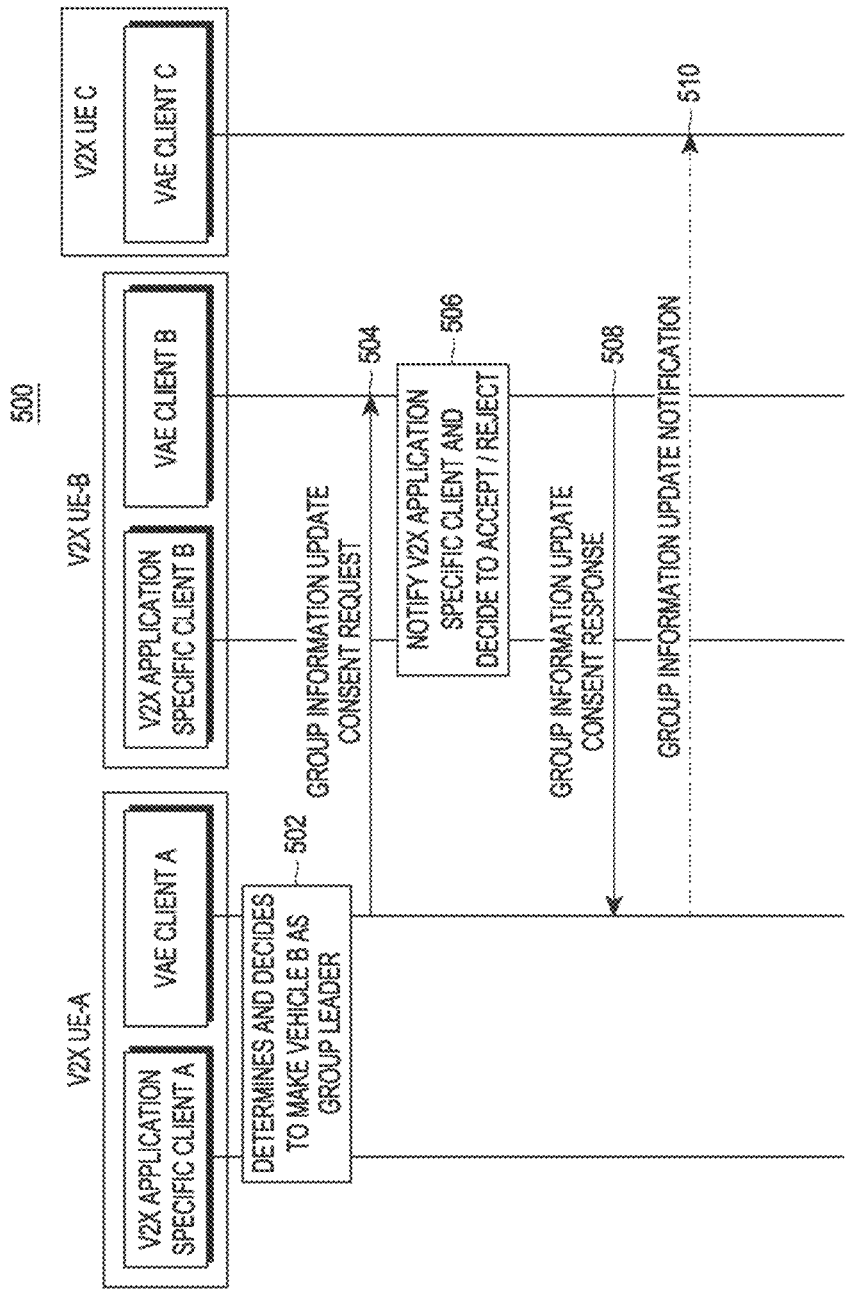
FIG. 5 illustrates an operational flow diagram depicting a process for updating group information associated with a group in an off-network communication by a VAE client, in accordance with an embodiment of the present subject matter.

FIG. 5 illustrates an operational flow diagram 500 depicting a process for updating group information associated with a group in an off-network communication by a VAE client, in accordance with an embodiment of the present subject matter. In an embodiment, the VAE client may be a VAE client related to a leader of the group. In an embodiment, the group may be a platoon of vehicles and the group may interchangeably be referred as the platoon of vehicles. In an embodiment, the platoon of vehicles may include a plurality of vehicles (V2X UE A, V2X UE B, and V2X UE C) with a vehicle (V2X UE A) acting as a group leader broadcasting the group information to other vehicles (V2X UE B, and V2X UE C) present in the platoon of vehicles.

In an embodiment, the process may include determining (step 502) the V2X UE B as the new group leader in response to detecting a requirement to update the group information. In an embodiment, the determining may be performed by the VAE client A related to the V2X UE A as referred in the FIG. 1. In an embodiment, detecting the requirement may correspond to determining an inability associated with the V2X UE A and a capability related to the V2X UE B. In an embodiment, the inability may correspond to an inability to lead the group and the capability may correspond to a capability to lead the group. In an embodiment, updating the group information may correspond to updating at least one parameter associated with the group such that the group information consists of the at least parameter. In an embodiment, the at least one parameter may include information related to a group leader of the group such that the V2X UE B is selected as the new group leader by removing the V2X UE A acting as the group leader. In continuation with the above embodiment, the process may include informing by the V2X application specific client A as referred in the FIG. 1, the VAE client A for changing the group leader. In an embodiment, the V2X application client A may further be configured to share a V2X UE B identification, a group leader change type for changing the group leader.

Continuing with the above embodiment, the process may include transmitting (step 504) a group information update consent request to the VAE client B related to the V2X UE B as referred in the FIG. 2 in response to determining the capability associated with the V2X UE B. In an embodiment, the group information update consent request may be transmitted by the VAE client A. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

In an embodiment, the process may include notifying (step 506) by the VAE client B, the V2X application specific client B about receiving the group information update consent request. Moving ahead, the process may include accepting the group information update consent request. In an embodiment, the acceptance to the group information update consent request by the V2X UE B may indicate that the V2X UE B accepted to lead the group.

Continuing with the above embodiment, the process may proceed towards transmitting (step 508) by the VAE client B, a group information update consent response to the VAE client A indicating an acceptance of the group information update consent request by the V2X UE B. In an embodiment, the VAE client A may further be configured to update the group information associated with the group upon receiving the group information update consent response.

In an embodiment, the process includes (step 510) triggering, by the VAE client A, a group information update notification to at least one other V2X UE in the group, in response to determining that the group information is updated. In an embodiment, the at least one other UE may be the V2X UE C as referred in the FIG. 1. Furthermore, a VAE client C related to the V2X UE C may receive the group information update notification. In an embodiment, the group information update change notification may indicate that the group information is updated and the V2X UE B is the new group leader.

Figure 6:
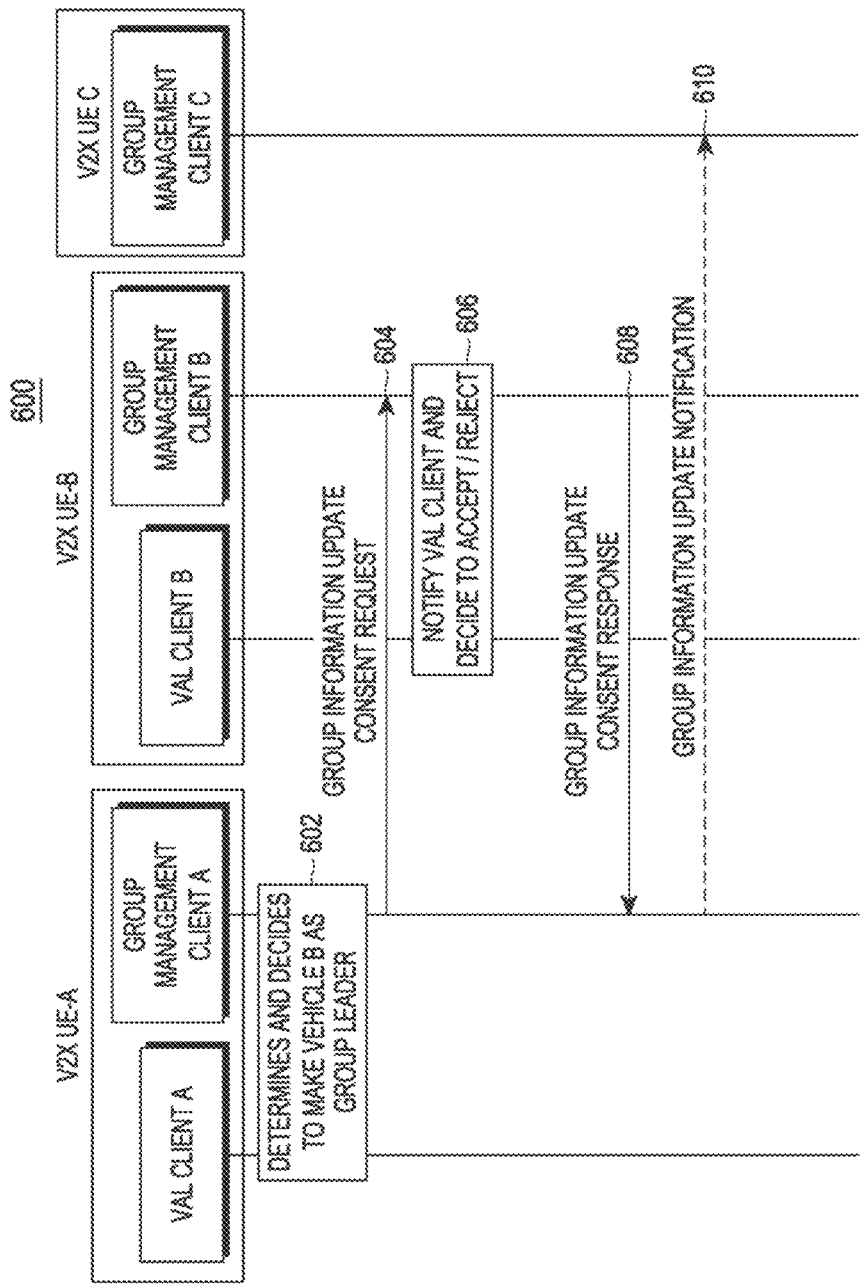
FIG. 6 illustrates an operational flow diagram depicting a process for updating the group information in an off-network communication by a SEAL client, in accordance with an embodiment of the present subject matter.

FIG. 6 illustrates an operational flow diagram 600 depicting a process for updating the group information in an off-network communication by a SEAL client, in accordance with an embodiment of the present subject matter. In an embodiment, the SEAL client may be a group management client A. In an embodiment, the group may be a platoon of vehicles and the group may interchangeably be referred as the platoon of vehicles. In an embodiment, the platoon of vehicles may include a plurality of vehicles (V2X UE A, V2X UE B, and V2X UE C) with a vehicle (V2X UE A) acting as a group leader broadcasting the group information to other vehicles (V2X UE B, and V2X UE C) present in the platoon of vehicles.

In an embodiment, the process may include determining (step 602) the V2X UE B as the new group leader in response to detecting a requirement to update the group information. In an embodiment, the determining may be performed by the group management client A related to the V2X UE A as referred in the FIG. 2. In an embodiment, detecting the requirement may correspond to determining an inability associated with the V2X UE A and a capability related to the V2X UE B. In an embodiment, the inability may correspond to an inability to lead the group and the capability may correspond to a capability to lead the group. In an embodiment, updating the group information may correspond to updating at least one parameter associated with the group such that the group information consists of the at least parameter. In an embodiment, the at least one parameter may include information related to a group leader of the group such that the V2X UE B is selected as the new group leader by removing the V2X UE A acting as the group leader. In continuation with the above embodiment, the process may include informing by the VAL client A as referred in the FIG. 2, the group management client A for changing the group leader. In an embodiment, the V2X application client A may further be configured to share a V2X UE B identification, a group leader change type for changing the group leader.

Continuing with the above embodiment, the process may include transmitting (step 604) a group information update consent request to the group management client B related to the V2X UE B as referred in the FIG. 2 in response to determining the capability associated with the V2X UE B. In an embodiment, the group information update consent request may be transmitted by the group management client A. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

In an embodiment, the process may include notifying (step 606) by the group management client B, the VAL client B about receiving the group information update consent request. Moving ahead, the process may include accepting the group information update consent request. In an embodiment, the acceptance to the group information update consent request by the V2X UE B may indicate that the V2X UE B accepted to lead the group.

Continuing with the above embodiment, the process may proceed towards transmitting (step 608) by the group management client B, a group information update consent response to the group management client A indicating an acceptance of the group information update consent request by the V2X UE B. In an embodiment, the group management client A may further be configured to update the group information associated with the group upon receiving the group information update consent response.

In an embodiment, the process includes (step 610) triggering, by the group management client A, a group information update notification to at least one other V2X UE in the group, in response to determining that the group information is updated. In an embodiment, the at least one other UE may be the V2X UE C as referred in the FIG. 1. Furthermore, a group management client C related to the V2X UE C may receive the group information update notification. In an embodiment, the group information update change notification may indicate that the group information is updated and the V2X UE B is the new group leader.

Figure 7:
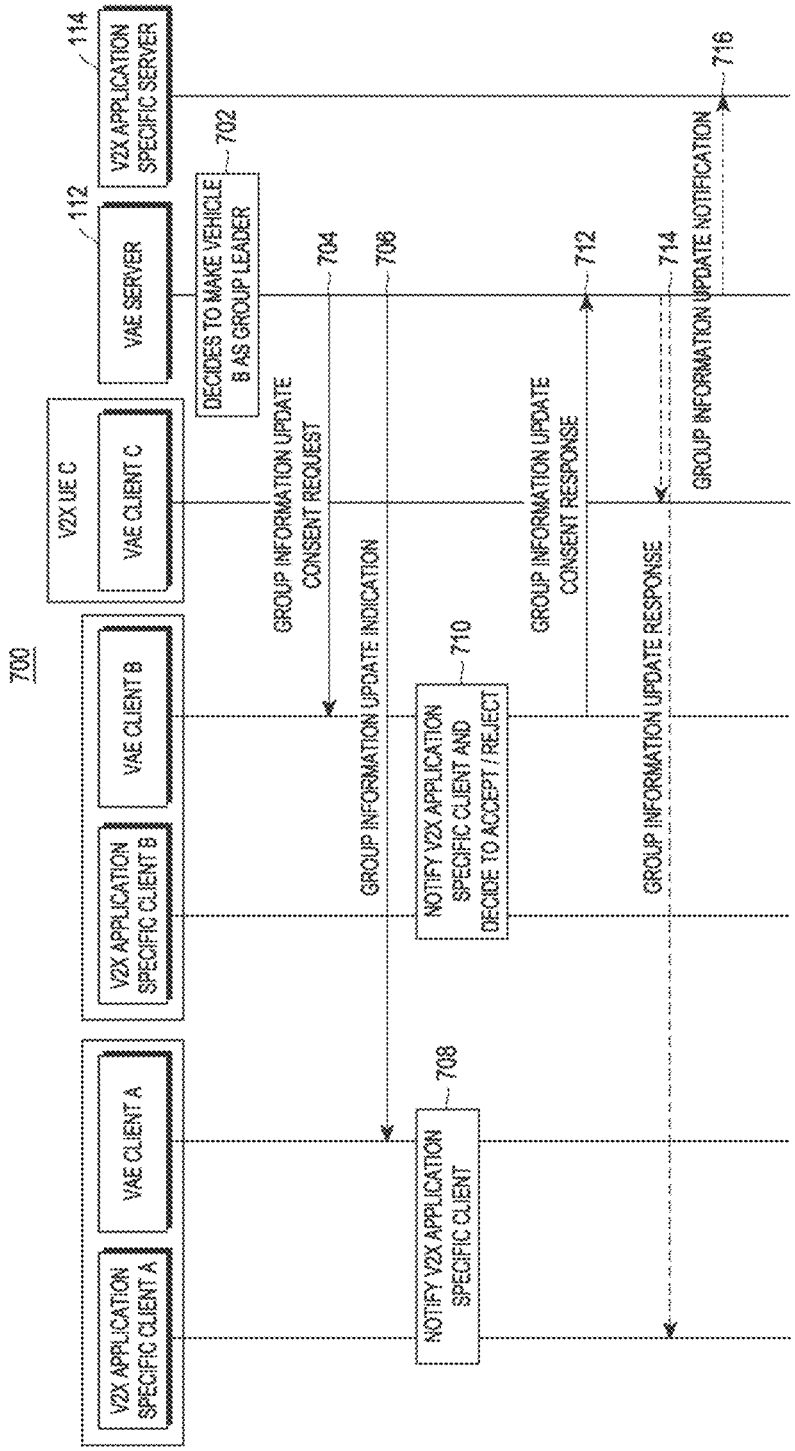
FIG. 7 illustrates an operational flow diagram depicting a process for updating group information associated with a group by a VAE server in an on-network communication, in accordance with an embodiment of the present subject matter.

FIG. 7 illustrates an operational flow diagram 700 depicting a process for updating group information associated with a group by the VAE server 112 as referred in the FIG. 1 in an on-network communication, in accordance with an embodiment of the present subject matter. In an embodiment, the group may be a platoon of vehicles and the group may interchangeably be referred as the platoon of vehicles. In an embodiment, the platoon of vehicles may include a plurality of vehicles (V2X UE A, V2X UE B, and V2X UE C) with a vehicle (V2X UE A) acting as a group leader broadcasting the group information to other vehicles (V2X UE B, and V2X UE C) present in the platoon of vehicles. Continuing with the above embodiment, the process may include determining (step 702) the V2X UE B as the new group leader in response to detecting a requirement to update the group information. In an embodiment, the determining may be performed by the VAE server 112 as referred in the FIG. 1. In an embodiment, detecting the requirement may correspond to determining an inability associated with the V2X UE A and a capability related to the V2X UE B. In an embodiment, the inability may correspond to an inability to lead the group and the capability may correspond to a capability to lead the group. In an embodiment, updating the group information may correspond to updating at least one parameter associated with the group such that the group information consists of the at least parameter. In an embodiment, the at least one parameter may include information related to a group leader of the group such that the V2X UE B is selected as the new group leader by removing the V2X UE A acting as the group leader.

Continuing with the above embodiment, the process may include transmitting (step 704) a group information update consent request to the V2X UE B in response to determining the capability associated with the V2X UE B. In an embodiment, the group information update consent request may be transmitted by the VAE server 112. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

In an embodiment, the process may include transmitting (step 706) by the VAE server 112, a message indicating that the VAE server 112 is initiating a group information update procedure to select the V2X UE B as the new group leader to the VAE client A as referred in the FIG. 1.

Moving forward, the process may proceed towards notifying (step 708) by the VAE client A to the V2X application specific client A as referred in the FIG. 1 about the group information update procedure to select the V2X UE B as the new group leader.

In an embodiment, the process may include notifying (step 710) by the VAE client B, the V2X application specific client B about receiving the group information update consent request. Moving ahead, the process may include accepting the group information update consent request. In an embodiment, the acceptance to the group information update consent request by the V2X UE B may indicate that the V2X UE B accepted to lead the group.

Continuing with the above embodiment, the process may proceed towards transmitting (step 712) by the VAE client B, a group information update consent response to VAE server 112 indicating an acceptance of the group information update consent request by the V2X UE B. In an embodiment, the VAE server 112 may further be configured to update the group information associated with the group upon receiving the group information update consent response. In an embodiment, where it is determined that the V2X UE A is un-available, the VAE server 112 may be configured to update the group information by select the V2X UE B as the new group leader based on an instruction from the V2X application specific server 114.

In an embodiment, the process includes (step 714) transmitting by the VAE server 112 a group information update notification to the V2X application specific client A and a VAE client C related to the V2X UE C indicating that the group information is updated.

In an embodiment, the process may include triggering (step 716) by the VAE server 112 the group information update notification to the V2X application specific server 114 upon updating the group information. In an embodiment, the group information update change notification may indicate that the group information is updated and the V2X UE B is the new group leader.

Figure 8:
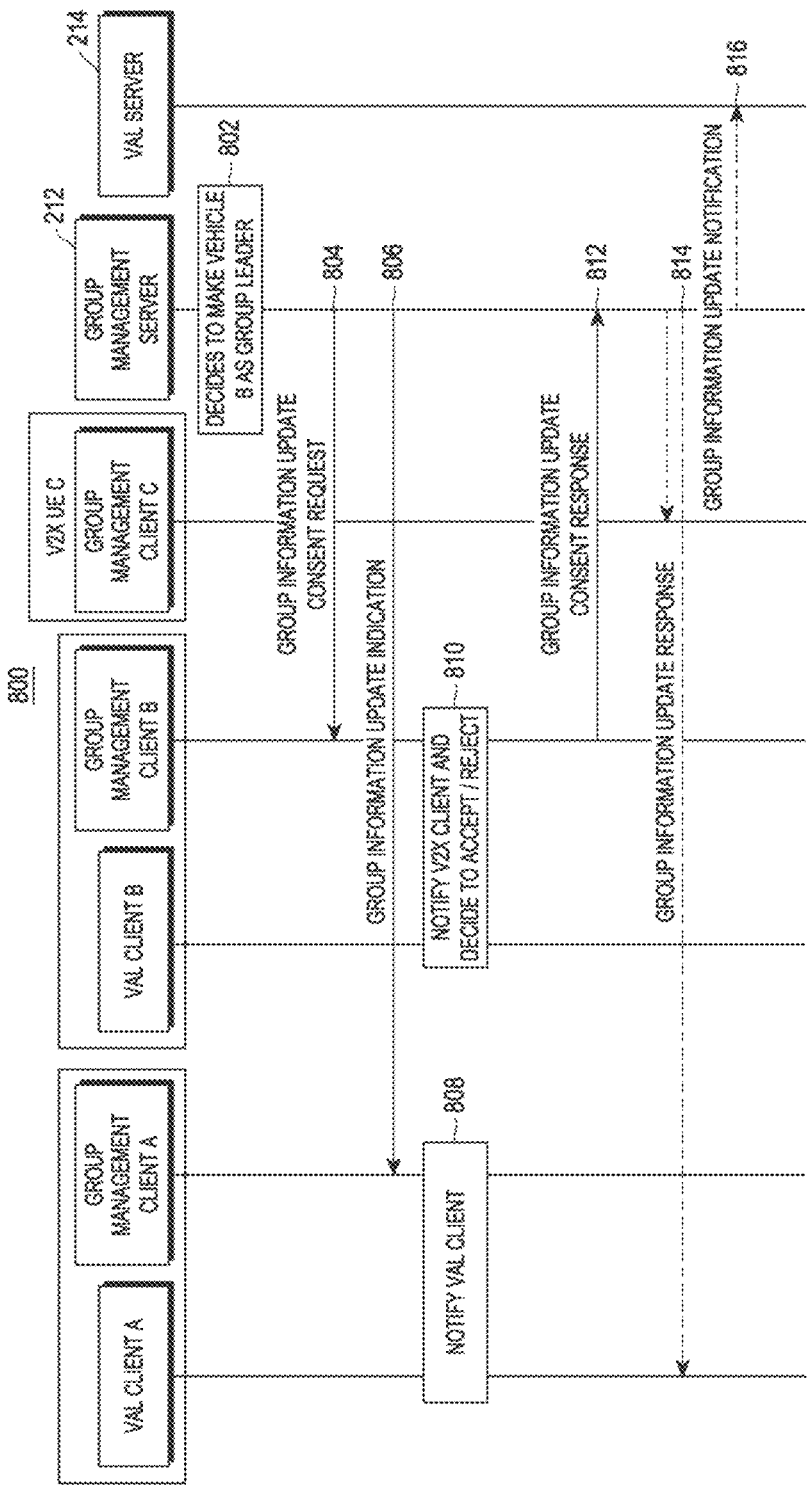
FIG. 8 illustrates an operational flow diagram depicting a process for updating group information associated with a group by a SEAL server in an on-network communication, in accordance with an embodiment of the present subject matter.

FIG. 8 illustrates an operational flow diagram 800 depicting a process for updating group information associated with a group by a SEAL server in an on-network communication, in accordance with an embodiment of the present subject matter. In an embodiment, the SEAL server may be the group management server 212 as referred in the FIG. 2. In an embodiment, the group may be a platoon of vehicles and the group may interchangeably be referred as the platoon of vehicles. In an embodiment, the platoon of vehicles may include a plurality of vehicles (V2X UE A, V2X UE B, and V2X UE C) with a vehicle (V2X UE A) acting as a group leader broadcasting the group information to other vehicles (V2X UE B, and V2X UE C) present in the platoon of vehicles.

Continuing with the above embodiment, the process may include determining (step 802) the V2X UE B as the new group leader in response to detecting a requirement to update the group information. In an embodiment, the determining may be performed by the Group management server 212 as referred in the FIG. 1. In an embodiment, detecting the requirement may correspond to determining an inability associated with the V2X UE A and a capability related to the V2X UE B. In an embodiment, the inability may correspond to an inability to lead the group and the capability may correspond to a capability to lead the group. In an embodiment, updating the group information may correspond to updating at least one parameter associated with the group such that the group information consists of the at least parameter. In an embodiment, the at least one parameter may include information related to a group leader of the group such that the V2X UE B is selected as the new group leader by removing the V2X UE A acting as the group leader.

Continuing with the above embodiment, the process may include transmitting (step 804) a group information update consent request to the V2X UE B in response to determining the capability associated with the V2X UE B. In an embodiment, the group information update consent request may be transmitted by the Group management server 212 to the group management client B. In an embodiment, the capability related to the V2X UE B may be determined based on a number of parameters. In an embodiment, the number of parameters may include a fuel amount, one or more sensors, and a presence of an application to communicate and coordinate with the at least one other V2X UE in the group.

In an embodiment, the process may include transmitting (step 806) by the Group management server 212, a message indicating that the Group management server 212 is initiating a group information update procedure to select the V2X UE B as the new group leader to the group management client A as referred in the FIG. 2.

Moving forward, the process may proceed towards notifying (step 808) by the group management client A to the VAL client A as referred in the FIG. 1 about the group information update procedure to select the V2X UE B as the new group leader.

In an embodiment, the process may include notifying (step 810) by the group management client B, the VAL client B about receiving the group information update consent request. Moving ahead, the process may include accepting the group information update consent request. In an embodiment, the acceptance to the group information update consent request by the V2X UE B may indicate that the V2X UE B accepted to lead the group.

Continuing with the above embodiment, the process may proceed towards transmitting (step 812) by the group management client B, a group information update consent response to group management server 212 indicating an acceptance of the group information update consent request by the V2X UE B. In an embodiment, the group management server 212 may further be configured to update the group information associated with the group upon receiving the group information update consent response.

In an embodiment, the process includes (step 814) transmitting by the group management server 212 a group information update notification to the VAL client A and a group management client C related to the V2X UE C indicating that the group information is updated.

In an embodiment, the process may include triggering (step 816) by the group management server 212 the group information update notification to the VAL server 214 upon updating the group information. In an embodiment, the group information update change notification may indicate that the group information is updated and the V2X UE B is the new group leader.

Figure 9:
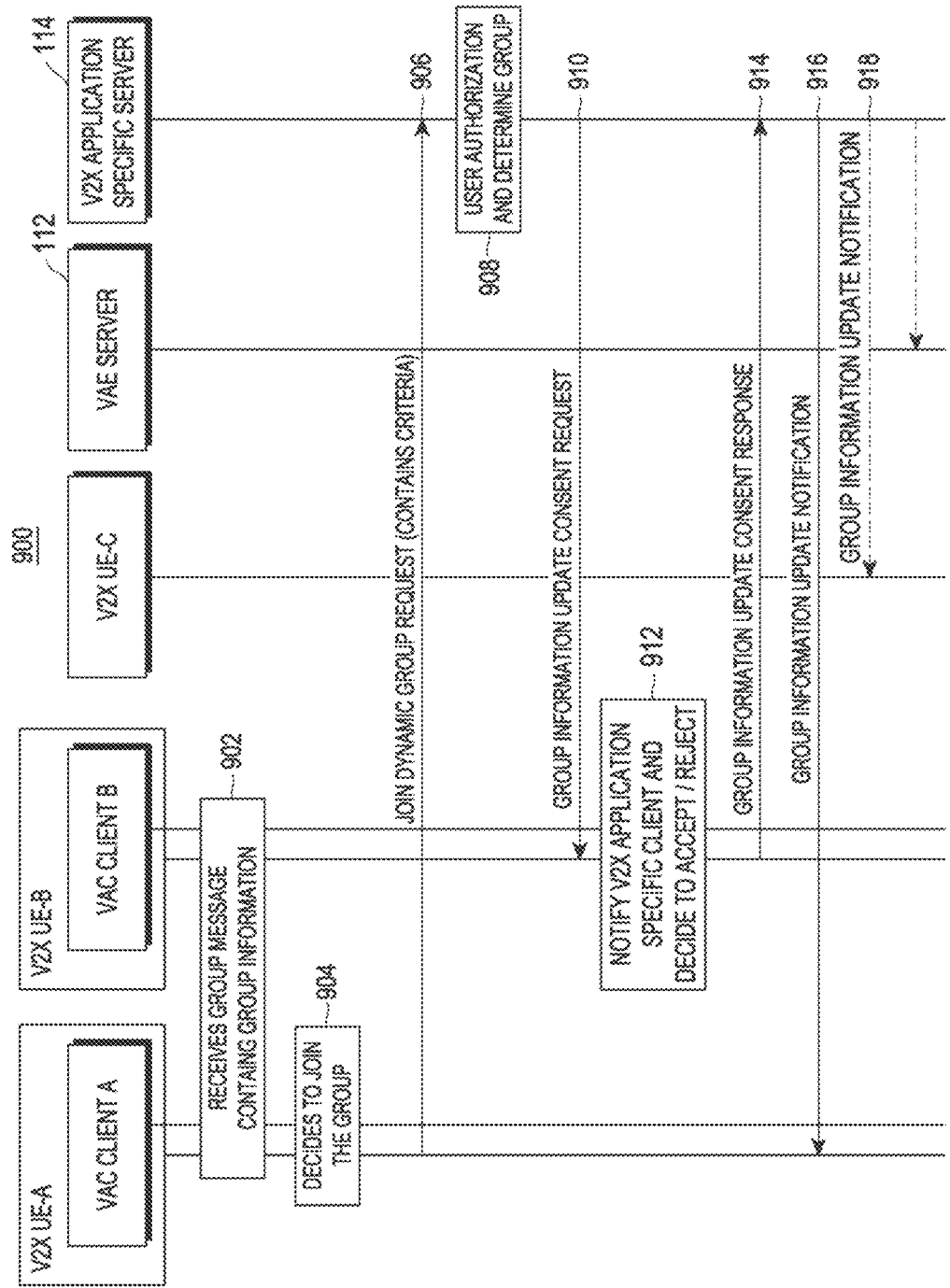
FIG. 9 illustrates an operational flow diagram depicting a process for joining a dynamic group by a V2X UE A, in accordance with an embodiment of the present subject matter.

FIG. 9 illustrates an operational flow diagram 900 depicting a process for joining a dynamic group by a V2X UE A, in accordance with an embodiment of the present subject matter. In an embodiment, the V2X UE A may request to join the group. In an embodiment, the group may be a platoon of vehicles and the group may interchangeably be referred as the platoon of vehicles. In an embodiment, the platoon of vehicles may include a plurality of vehicles (V2X UE B, and V2X UE C) with a vehicle (V2X UE B) acting as a group leader broadcasting the group information to other vehicles (V2X UE C) present in the platoon of vehicles.

Continuing with the above embodiment, the process may include receiving (step 902) by the V2X UE A as referred in the FIG. 1 a group message containing the group information. In an embodiment, the group message may be transmitted by the group. In an embodiment, the group message may be transmitted by the group leader.

Moving forward, the process may include deciding (step 902) by the V2X UE A, to join the group in response to receiving a group message containing the group information.

Moving forward, the process may proceed towards transmitting (step 906) by the V2X UE A, a join dynamic group request to the V2X application specific server 114 as referred in the FIG. 1. In an embodiment, the join dynamic group request may include criteria associated with the group.

In an embodiment, the process may proceed towards determining (step 908), by the V2X application specific server, the group to be joined by the V2X UE A. In an embodiment, the group may be determined based on authorizing a user associated with the group by the V2X application specific server 114.

In continuation with the above embodiment, the process may include transmitting (step 910) by the V2X application specific server 114 a group information update consent request to V2X UE B as referred in the FIG. 1 in response to receiving the join dynamic group request from the V2X UE A.

Moving forward, the process may include notifying (step 912) by the V2X UE B, the V2X application specific client B about receiving the group information update consent request. Further, the process may include accepting the group information update consent request. In an embodiment, the acceptance to the group information update consent request by the V2X UE B may indicate that the V2X UE B accepted to allow the V2X UE A to join the group.

Continuing with the above embodiment, the process may include transmitting (step 914) by the V2X UE B a group information update consent response to the V2X application specific server 114 indicating an acceptance of the group information update consent request by the V2X UE A. In an embodiment, the V2X application specific server 114 may further be configured to update the group information associated with the group upon receiving the group information update consent response.

In an embodiment, the process includes (step 916) transmitting by the V2X application specific server 114, a group information update notification to the V2X UE A indicating that the group information is updated and the V2X UE A is a part of the group.

In an embodiment, the process may include triggering (step 918) by the V2X application specific server 114 the group information update notification to the VAE server 112 and a V2X UE C upon updating the group information. In an embodiment, the group information update change notification may indicate that the group information is updated.

FIG. 10 illustrates a schematic block diagram 1000 depicting a method for updating group information associated with a group in an on-network communication, according to an embodiment of the present subject matter. In an example, the method 1000 may be implemented by the system 102 using components thereof, as described above. Further, for the sake of brevity, details of the present subject matter that are explained in details in the description of FIG. 1 to FIG. 9 are not explained in detail in the description of FIG. 10.

At block 1002, the method includes transmitting, by a Vehicle to Everything (V2X) Application Enabler (VAE) client A associated with a V2X User Equipment (UE) A, a group information update request to a VAE server in response to detecting a requirement to update the group information associated with the V2X UE A and a V2X UE B.

At block 1004, the method includes transmitting, by the VAE server, a group information update consent request to the V2X UE B in response to determining a capability associated with the V2X UE B based on a plurality of parameters associated with the V2X UE B.

At block 1006, the method includes transmitting, by the V2X UE B, a group information update consent response to the VAE server in response to accepting the group information update consent request.

At block 1008, the method includes transmitting, by the VAE server, a group information update response to VAE client A indicating an acceptance of the group information update consent request by the V2X UE B.

At block 1010, the method incudes updating, by the VAE server, the group information associated with the group in response to determining that the V2X UE B accepted the group information update consent request.

FIG. 11 illustrates a schematic block diagram 1100 depicting a method for updating group information associated with a group in an off-network communication, according to an embodiment of the present subject matter. In an example, the method 1000 may be implemented by the system 102 using components thereof, as described above. Further, for the sake of brevity, details of the present subject matter that are explained in details in the description of FIG. 1 to FIG. 10 are not explained in detail in the description of FIG. 11.

At block 1102, the method includes transmitting, by a VAE client A, a group information update consent request to a VAE client B in response to detecting a requirement to update the group information.

At block 1104, the method includes notifying, by the VAE client B, a V2X application specific client B, about receiving the group information update consent request in response to receiving the group information update consent request.

At block 1106, the method includes generating, by the VAE client B, a group information update consent response indicating an acceptance of the group information update consent request in response to receiving the group information update consent request.

At block 1108, the method includes updating, by the V2X UE A, the group information associated with the group in response to determining that the V2X UE B accepted the group information update consent request.

FIG. 12 illustrates a schematic block diagram 1200 depicting a method for updating group information associated with a group by a VAE server in an on-network communication, according to an embodiment of the present subject matter. In an example, the method 1200 may be implemented by the system 102 using components thereof, as described above. Further, for the sake of brevity, details of the present subject matter that are explained in details in the description of FIG. 1 to FIG. 11 are not explained in detail in the description of FIG. 12.

At block 1202, the method includes transmitting, by the VAE server, a group information update consent request to a VAE client B in response to detecting a requirement to update the group information by V2X application specific server, wherein the VAE server further notifies the V2X UE A about a group information update.

At block 1204, the method includes notifying, by a VAE client A associated with the V2X UE A, a V2X application specific client A about the impending group information update.

At block 1206, the method includes deciding, by a V2X application specific client B, to accept the group information update consent request upon being notified by the VAE client B about receiving the group information update consent request.

At block 1208, the method includes transmitting, by the VAE client B, a group information update consent response to the VAE server indicating an acceptance for the group information update consent request.

At block 1210, the method includes updating, by the VAE server, the group information associated with the group.

FIG. 13 illustrates a schematic block diagram 1300 depicting a method for updating group information associated with a group by a V2X UE A, according to an embodiment of the present subject matter. In an example, the method 1300 may be implemented by the system 102 using components thereof, as described above. Further, for the sake of brevity, details of the present subject matter that are explained in details in the description of FIG. 1 to FIG. 12 are not explained in detail in the description of FIG. 13.

At block 1302, the method includes transmitting, by a V2X application specific server, a group information update consent request to a V2X UE B in response to receiving a join dynamic group request from the V2X UE A.

At block 1304, the method includes transmitting, by the V2X UE B, a group information update consent response to a V2X application specific server indicating an acceptance for the group information update request upon notifying a V2X application specific client B about receiving the group information update consent request.

At block 1306, the method includes transmitting, by the V2X application specific server, the group information update consent response to the V2X UE A.

At block 1308, the method includes updating, by the V2X application specific server, the group information associated with the group and transmitting a group information update notification to at least one other V2X UE in the group and a VAE server.

FIG. 14 is a block diagram of a V2X UE according to an embodiment of the disclosure. The V2X UE may correspond to each of the V2X UE shown in FIGS. 1-13. For example, the V2X UE may refer to V2X UE A, V2X UE B or V2X UE C shown in FIG. 1-13.

Referring to FIG. 14, the V2X UE may include a transceiver 1410, a controller 1420, and storage 1430. In the present disclosure, the controller 1420 may include a circuit, an ASIC, or at least one processor.

The transceiver 1410 may transmit and receive signals to and from another V2X UE or server.

The controller 1420 may control the overall operation of V2X UE according to an embodiment. For example, the controller 1420 may control the signal flow to perform the operations in FIGS. 1-13 described above. For example, the control unit 1420 may process for updating group information associated with the group.

The storage 1430 may store at least one of information exchanged through the transceiver 1410 and information generated by the controller 1430.

FIG. 15 is a block diagram of a server according to an embodiment of the disclosure. The server may correspond to each of the server shown in FIGS. 1-13. For example, the server may refer to VAE Server or V2X Application Specific Server shown in FIG. 1-13.

Referring to FIG. 15, the server may include a transceiver 1510, a controller 1520, and storage 1530. In the present disclosure, the controller 1520 may include a circuit, an ASIC, or at least one processor.

The transceiver 1510 may transmit and receive signals to and from V2X UE or another server.

The controller 1520 may control the overall operation of the server according to an embodiment. For example, the controller 1520 may control the signal flow to perform the operations in FIGS. 1-13 described above. For example, the control unit 1520 may process for updating group information associated with the group.

The storage 1530 may store at least one of information exchanged through the transceiver 1510 and information generated by the controller 1530.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method performed by a vehicle to everything (V2X) application enabler (VAE) server in a V2X communication system, the method comprising:
receiving, from a first VAE client associated with a first V2X user equipment (UE), a group information update request to update group information of a group associated with the first V2X UE and a second V2X UE;
transmitting, to the second V2X UE, a group information update consent request based on identifying a capability associated with the second V2X UE;
receiving, from the second V2X UE, a group information update consent response, the group information update consent response including information for informing whether the group information update consent request is accepted by the second V2X UE; and
transmitting, to the first VAE client, a group information update response to inform a success or a failure for the group information update request,
wherein the group information update consent request comprises a group identification associated with the group, and relevant information about update of the group information, the relevant information including information indicating whether the update of the group information is time bound, or permanent.

2. The method of claim 1, further comprising:
updating the group information and triggering a group information update notification for the updated group information to at least one other V2X UE in the group and a V2X application specific server, based on identifying the success for the group information update request.

3. The method of claim 1, wherein the capability associated with the second V2X UE indicates that the second V2X UE is capable to lead the group.

4. The method of claim 3, wherein the group information update consent response includes information for informing that the group information update consent request is accepted by the second V2X UE, in case that the second V2X UE accepts to lead the group.

5. The method of claim 1, wherein the group information update request comprises at least one of the group identification associated with the group, a group leader identification of a group leader to be changed, and the relevant information for update of the group information, the group leader identification corresponding to an identification of the second V2X UE.

6. The method of claim 1, further comprising:
suggesting a third V2X UE as a potential group leader of the group to the first V2X UE, based on identifying that the group information update consent response includes information for informing that the group information update consent request is not accepted by the second V2X UE.

7. The method of claim 1, wherein updating of the group information is associated with changing a group leader of the group from the first V2X UE to the second V2X UE.

8. A method performed by a vehicle to everything (V2X) application enabler (VAE) server in a V2X communication system, the method comprising:
transmitting, to a second VAE client associated with a second V2X user equipment (UE), a group information update consent request for group information update of a group associated with the first V2X UE and a second V2X UE
transmitting, to a first VAE client associated with a first V2X UE, an indication about the group information update; and
receiving, from the second VAE client, a group information update consent response, the group information update consent response including information for informing whether the group information update consent request is accepted by the second V2X UE,
wherein the group information update consent request comprises a group identification of the group and relevant information about the group information update, the relevant information including information indicating whether the group information update is time bound, or permanent.

9. The method of claim 8, further comprising:
updating group information of the group, in case that the group information update consent response includes information for informing that the group information update consent request is accepted by the second V2X UE.

10. The method of claim 8,
wherein the group information update is associated with changing a group leader of the group from the first V2X UE to the second V2X UE, and
wherein, the group information update consent response includes information for informing that the group information update consent request is accepted by the second V2X UE, in case that the second V2X UE accepts to lead the group.

11. A vehicle to everything (V2X) application enabler (VAE) server in a V2X communication system, the VAE server comprising:
a transceiver; and
a controller coupled with the transceiver and configured to:
receive, from a first VAE client associated with a first V2X user equipment (UE), a group information update request to update group information of a group associated with the first V2X UE and a second V2X UE;
transmit, to the second V2X UE, a group information update consent request based on identifying a capability associated with the second V2X UE;
receive, from the second V2X UE, a group information update consent response, the group information update consent response including information for informing whether the group information update consent request is accepted by the second V2X UE; and
transmit, to the first VAE client, a group information update response to inform a success or a failure for the group information update request,
wherein the group information update consent request comprises a group identification associated with the group, and relevant information about update of the group information, the relevant information including information indicating whether the update of the group information is time bound, or permanent.

12. The VAE server of claim 11, wherein the controller is further configured to:
update the group information and triggering a group information update notification for the updated group information to at least one other V2X UE in the group and a V2X application specific server, based on identifying the success for the group information update request.

13. The VAE server of claim 11, wherein updating of the group information is associated with changing a group leader of the group from the first V2X UE to the second V2X UE.

14. The VAE server of claim 11, wherein the capability associated with the second V2X UE indicates that the second V2X UE is capable to lead the group.

15. The VAE server of claim 14, wherein the group information update consent response includes information for informing that the group information update consent request is accepted by the second V2X UE, in case that the second V2X UE accepts to lead the group.

16. The VAE server of claim 11, wherein the group information update request further comprises a group leader identification of a group leader to be changed, the group leader identification corresponding to an identification of the second V2X UE.

17. A vehicle to everything (V2X) application enabler (VAE) server in a V2X communication system, the VAE server comprising:
a transceiver; and
a controller coupled with the transceiver and configured to control to:
transmit, to a second VAE client associated with a second V2X user equipment (UE), a group information update consent request for group information update of a group associated with the first V2X UE and a second V2X UE
transmit, to a first VAE client associated with a first V2X UE, an indication about the group information update; and
receive, from the second VAE client, a group information update consent response, the group information update consent response including information for informing whether the group information update consent request is accepted by the second V2X UE,
wherein the group information update consent request comprises a group identification of the group and relevant information about the group information update, the relevant information including information indicating whether the group information update is time bound, or permanent.

* * * * *